(12) United States Patent
Aoki

(10) Patent No.: US 11,024,337 B1
(45) Date of Patent: Jun. 1, 2021

(54) MAGNETIC DISK DEVICE AND WRITE PROCESSING METHOD

(71) Applicants: Kabushiki Kaisha Toshiba, Tokyo (JP); Toshiba Electronic Devices & Storage Corporation, Tokyo (JP)

(72) Inventor: Takao Aoki, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/017,050

(22) Filed: Sep. 10, 2020

(30) Foreign Application Priority Data

Mar. 18, 2020 (JP) .............................. JP2020-047785

(51) Int. Cl.
*G11B 5/54* (2006.01)
*G11B 27/36* (2006.01)
*G11B 20/12* (2006.01)

(52) U.S. Cl.
CPC .. *G11B 20/1258* (2013.01); *G11B 2020/1267* (2013.01); *G11B 2020/1292* (2013.01)

(58) Field of Classification Search
CPC ................. G11B 20/1217; G11B 5/09; G11B 2020/1238; G11B 5/54; G11B 5/00; G11B 5/012; G11B 20/12; G11B 20/18; G06F 12/0253; G06F 2212/702; G06F 3/0611; G06F 3/0646; G06F 3/0653; G06F 3/0676; G06F 12/0866; G06F 2212/1024; G06F 3/06; G06F 12/0246; G06F 3/0688
USPC ........................................................ 360/48, 75
See application file for complete search history.

(56) References Cited

U.S. PATENT DOCUMENTS

| 8,896,953 | B2 | 11/2014 | Haga et al. |
| 9,990,949 | B1 | 6/2018 | Liu et al. |
| 2017/0148484 | A1* | 5/2017 | Zhu ..................... G06F 12/0238 |
| 2018/0260159 | A1 | 9/2018 | Hall |

* cited by examiner

*Primary Examiner* — Nabil Z Hindi
(74) *Attorney, Agent, or Firm* — White & Case LLP

(57) ABSTRACT

According to one embodiment, a magnetic disk device includes a disk having a first region to which data is written by normal recording and a second region to which data is written by shingled recording, a head configured to write the data to the disk and read the data from the disk, and a controller configured to, when first data and second data is to be sequentially written to a third region of the second region, reserve a fourth region corresponding to the first data and the second data in the first region, write the first data to the fourth region, write the second data after the first data in the fourth region, and sequentially write the first data and the second data read from the fourth region to the third region.

20 Claims, 14 Drawing Sheets

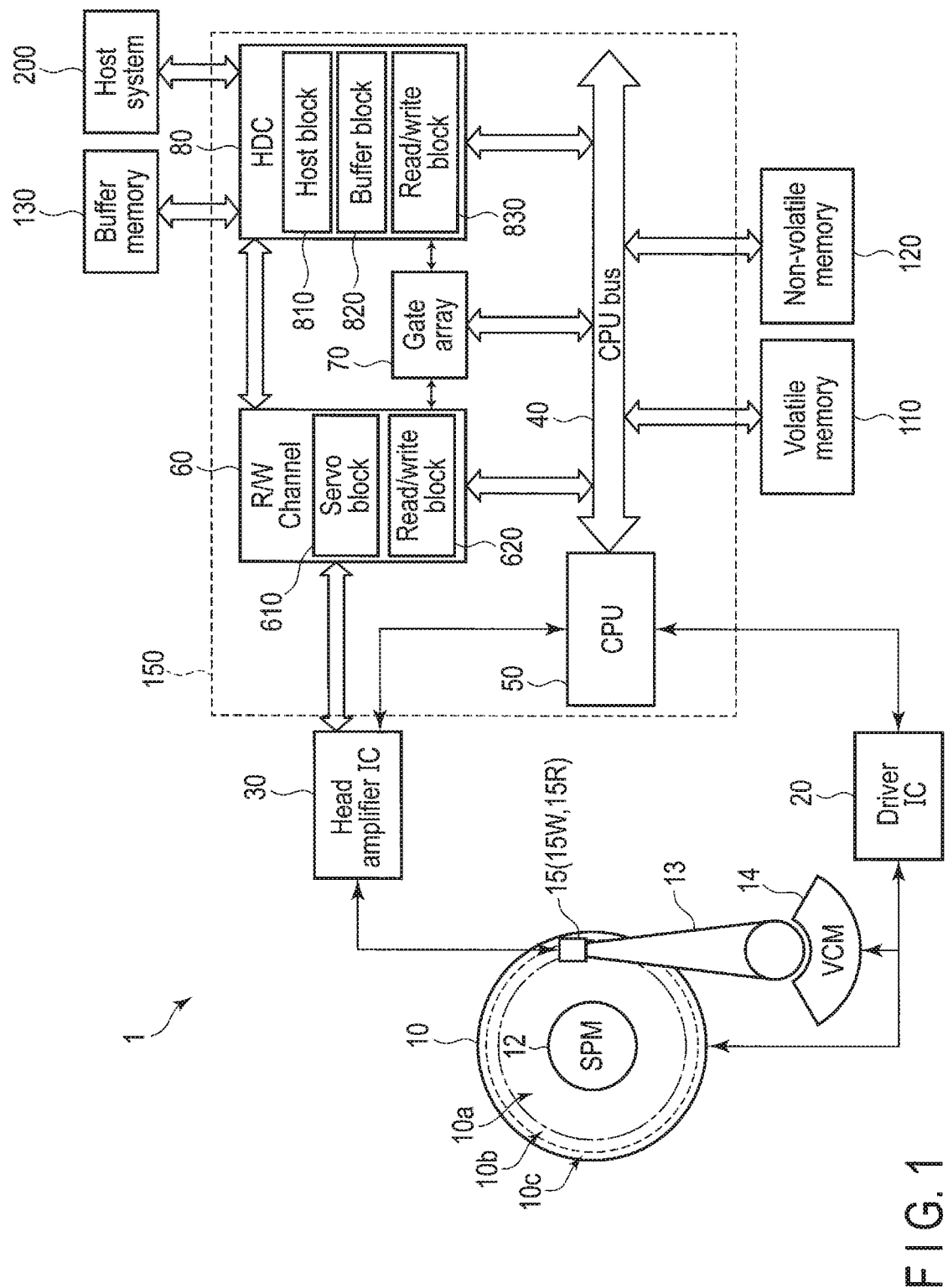
F I G. 1

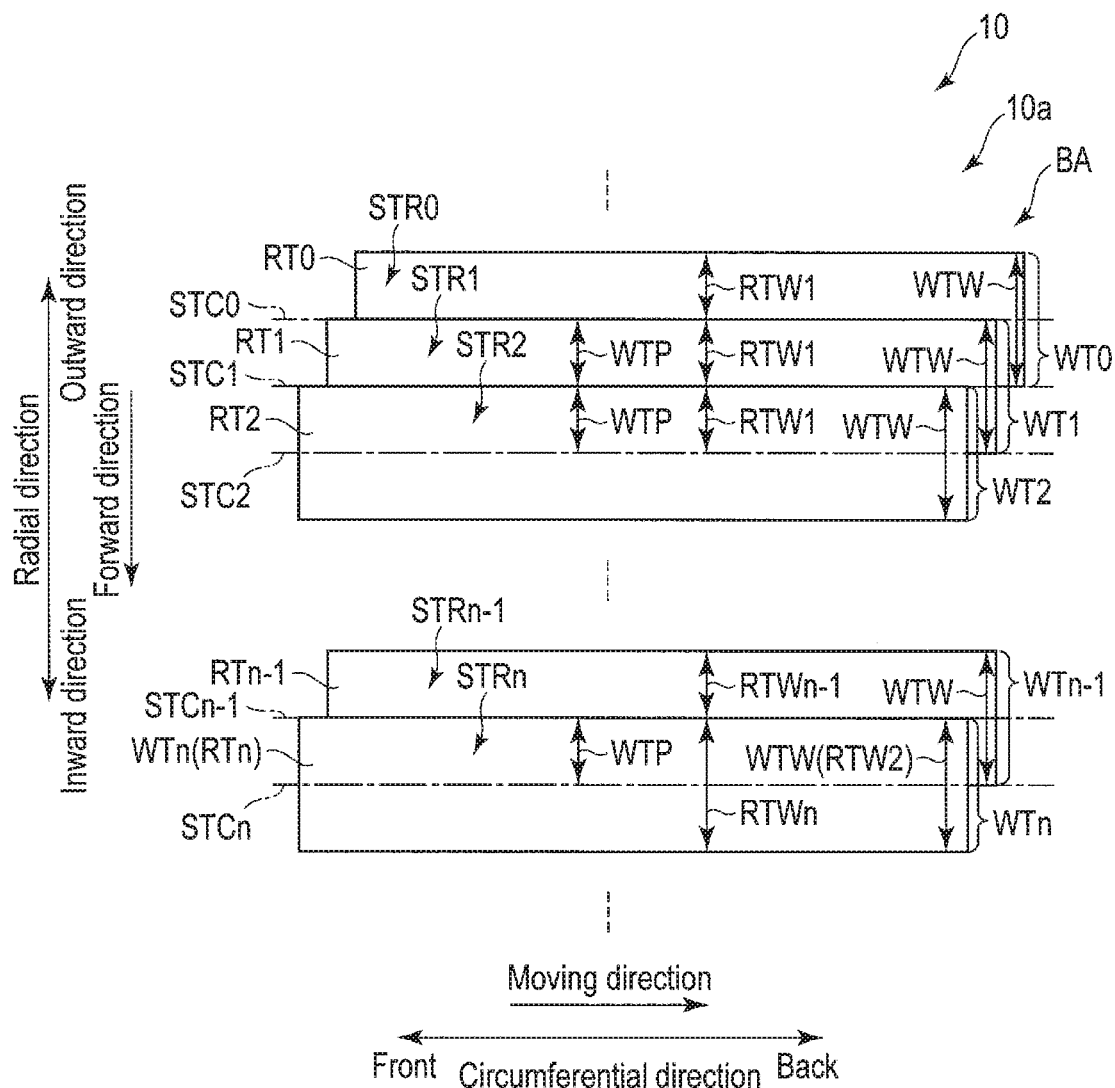
F I G. 4

| Physical band number | --- | PBAk-2 | PBAk-1 | PBAk | PBAk+1 | PBAk+2 | --- |
|---|---|---|---|---|---|---|---|
| Logical band number | --- | LBAk-2 | LBAk-1 | LBAk | LBAk+1 | SBA | --- |
TB1
F I G. 6
| Physical band number | --- | PBAk-2 | PBAk-1 | PBAk | PBAk+1 | PBAk+2 | --- |
|---|---|---|---|---|---|---|---|
| Logical band number | --- | LBAk-2 | SBA | LBAk | LBAk+1 | LBAk-1 | --- |
TB1
F I G. 7
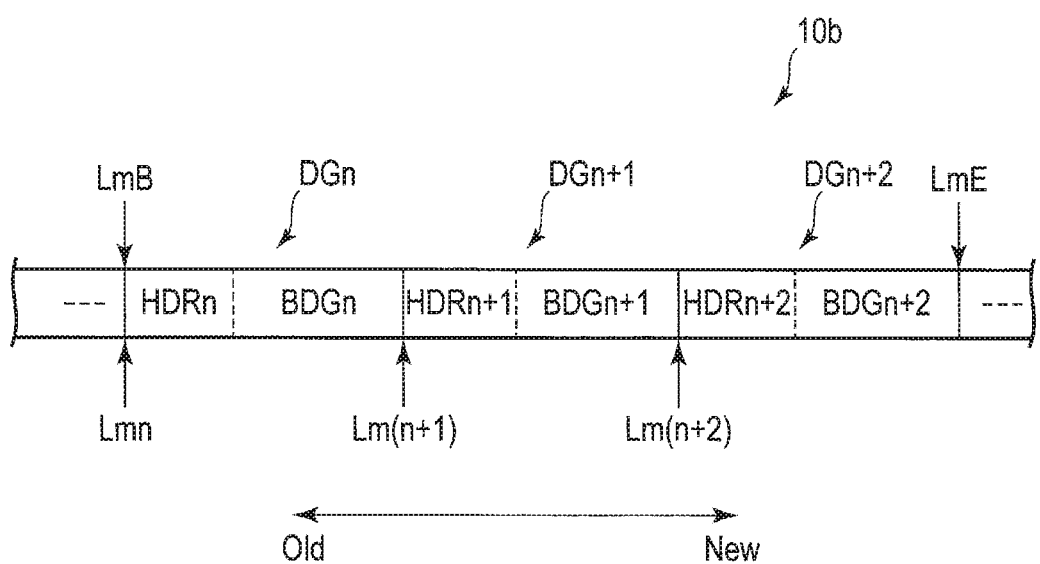
F I G. 8

| Data group (entry number) | In-data-group head LBA | In-data-group sector number | In-data-group head MCLBA | Extension index |
|---|---|---|---|---|
| ⋮ | ⋮ | ⋮ | ⋮ | ⋮ |
| DGn | Ln | NSn | Lmn | En |
| DGn+1 | Ln+1 | NSn+1 | Lmn+1 | En+1 |
| DGn+2 | Ln+2 | NSn+2 | Lmn+2 | En+2 |
| ⋮ | ⋮ | ⋮ | ⋮ | ⋮ |

| Entry number | LBA offset | Continuous valid sector number |
|---|---|---|
| ⋮ | ⋮ | ⋮ |
| En | On0 | Bn0 |
|  | On1 | Bn1 |
|  | ⋮ | ⋮ |
| En+1 | O(n+1)0 | B(n+1)0 |
|  | O(n+1)1 | B(n+1)1 |
|  | ⋮ | ⋮ |
| ⋮ | ⋮ | ⋮ |

| Data group (entry number) | In-data-group head LBA | In-data-group sector number | In-data-group head MCLBA | Extension index |
|---|---|---|---|---|
| ⋮ | ⋮ | ⋮ | ⋮ | ⋮ |
| DGm | 1000 | 100 | 10000 | FFFFh |
| DGm+1 | 5000 | 200 | 20000 | 1 |
| ⋮ | ⋮ | ⋮ | ⋮ | ⋮ |

FIG. 11

| Entry number | LBA offset | Continuous valid sector number |
|---|---|---|
| ⋮ | ⋮ | ⋮ |
| 1 | 0 | 50 |
| | 100 | 100 |
| | FFFFFFFFh | FFFFFFFFh |
| | ⋮ | ⋮ |
| | FFFFFFFFh | FFFFFFFFh |
| ⋮ | ⋮ | ⋮ |

FIG. 12

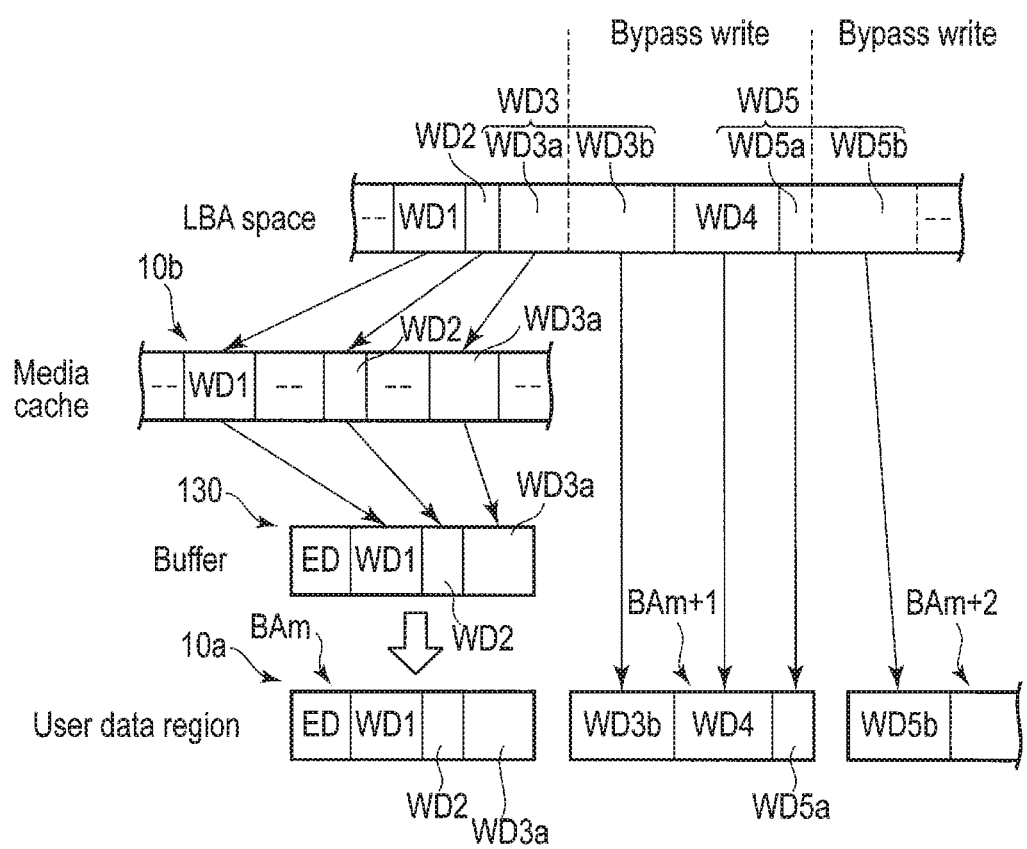
F I G. 16

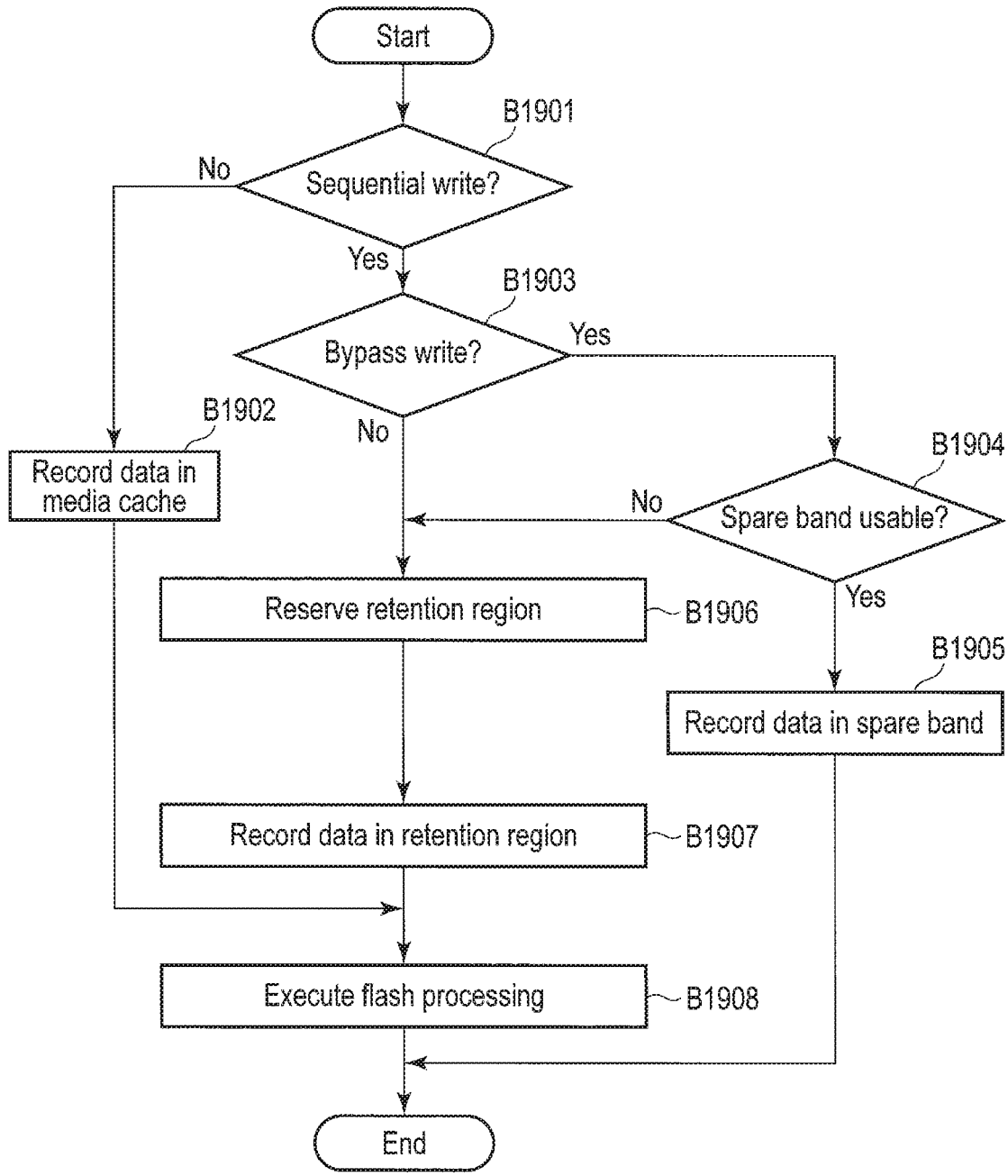
F I G. 19

| Entry number | LBA offset | Continuous valid sector number |
|---|---|---|
| ⋮ | ⋮ | ⋮ |
| E21 | OFS1 | NS1 |
| | OFS2 | NS2 |
| | FFFFFFFFh | FFFFFFFFh |
| | ⋮ | ⋮ |
| | FFFFFFFFh | FFFFFFFFh |
| ⋮ | ⋮ | ⋮ |

MAGNETIC DISK DEVICE AND WRITE PROCESSING METHOD

CROSS-REFERENCE TO RELATED APPLICATIONS

This application is based upon and claims the benefit of priority from Japanese Patent Application No. 2020-047785, filed Mar. 18, 2020, the entire contents of which are incorporated herein by reference.

FIELD

Embodiments described herein relate generally to a magnetic disk device and a write processing method.

BACKGROUND

Recently, a magnetic disk device having techniques to realize a high recording density has been developed. As the magnetic disk device that realizes a high recording density, there is a magnetic disk device of a shingled recording type (shingled write magnetic recording: SMR or shingled write recording: SWR) which writes a plurality of tracks in overlapped manner in the radial direction of a disk. There is also a magnetic disk device of the shingled recording type provided with a disk which has a media cache for temporarily writing the data transferred from a host system.

BRIEF DESCRIPTION OF THE DRAWINGS

FIG. 1 is a block diagram showing a configuration of a magnetic disk device according to a first embodiment.

FIG. 4 is a schematic diagram showing an example of shingled recording processing.

FIG. 6 is a diagram showing an example of a table of correspondence relations of physical bands to logical bands and a spare band.

FIG. 7 is a schematic diagram showing an example of data update processing of a particular logical band.

FIG. 8 is a schematic diagram showing an example of a media cache.

FIG. 9 is a schematic diagram showing an example of a main table.

FIG. 10 is a schematic diagram showing an example of an extension table.

FIG. 11 is a schematic diagram showing an example of the main table.

FIG. 12 is a schematic diagram showing an example of the extension table.

FIG. 16 is a schematic diagram showing an example of bypass write processing and flash processing.

FIG. 19 is a flow chart showing an example of write processing according to the first embodiment.

DETAILED DESCRIPTION

Figure 2:
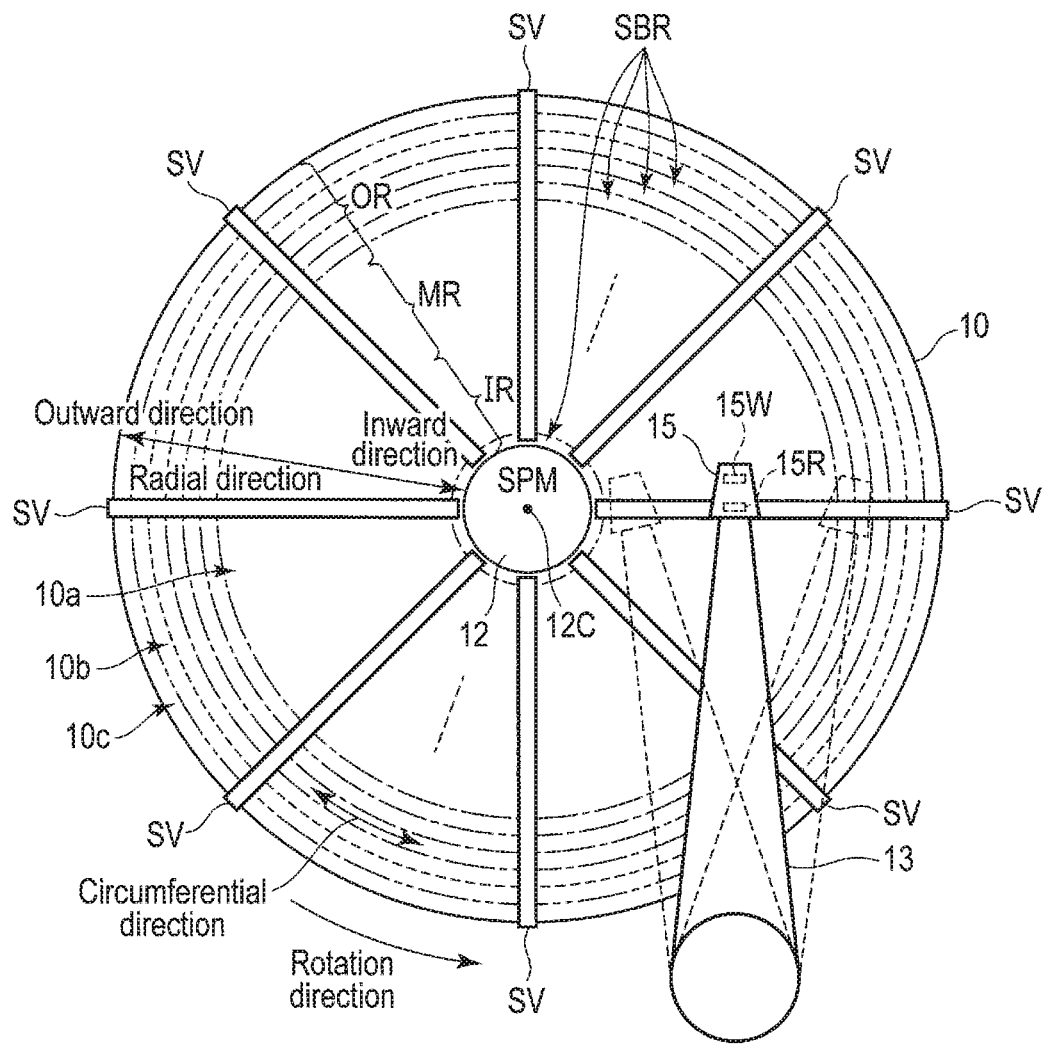
FIG. 2 is a schematic diagram showing an example of a disk according to the first embodiment.

In general, according to one embodiment, a magnetic disk device comprises: a disk having a first region to which data is written by normal recording that writes a plurality of tracks with an interval in a radial direction and having a second region to which data is written by shingled recording that writes a plurality of tracks overlapped in the radial direction; a head configured to write the data to the disk and read the data from the disk; and a controller configured to, when first data and second data is to be sequentially written to a third region of the second region, reserve a fourth region corresponding to the first data and the second data in the first region, write the first data to the fourth region, write the second data after the first data in the fourth region, and sequentially write the first data and the second data read from the fourth region to the third region.

Hereinafter, an embodiment will be described with reference to drawings. Note that the drawings are examples and do not limit the scope of the invention.

First Embodiment

FIG. 1 is a block diagram showing a configuration of a magnetic disk device 1 according to a first embodiment.

The magnetic disk device 1 is provided with a later-described head disk assembly (HDA), a driver IC 20, a head amplifier integrated circuit (hereinafter, head amplifier IC or preamplifier) 30, a volatile memory 110, a non-volatile memory 120, a buffer memory (buffer) 130, and a system controller 150, which is a one-chip integrated circuit. Also, the magnetic disk device 1 is connected to a host system (hereinafter, simply referred to as a host) 200. For example, the magnetic disk device 1 is a magnetic disk device for recording plural pieces of stream data in parallel. Hereinafter, "plural pieces of stream data" may be referred to as "multi-stream".

The HDA has a magnetic disk (hereinafter, referred to as a disk) 10, a spindle motor (hereinafter, referred to as a SPM) 12, an arm 13 on which a head 15 is mounted, and a voice coil motor (hereinafter, referred to as a VCM) 14. The disk 10 is attached to the SPM 12 and is rotated by driving the SPM 12. The arm 13 and the VCM 14 constitute an actuator. The actuator subjects the head 15, which is mounted on the arm 13, to movement control to a particular position of the disk 10 by driving the VCM 14. The head 15 moves about the center of a rotation axis of the VCM 14 within the range overlapped with the disk 10 in an arc trajectory. Each of the numbers of the disk(s) 10 and the head(s) 15 provided may be two or more.

A user data region 10*a* which can be used by users, a media cache (or may be referred to as a media cache region) 10*b* which temporarily retains data (or commands) transferred from a host or the like before writing the data to a particular region in the user data region 10*a*, and a system area 10*c* to which information necessary for system control is written are allocated to the regions of the disk 10 to which the data is writable. In the user data region 10*a*, user data transferred from the host 200 or the like is written. In the system area 10*c*, control information such as a defect map, a control table of the media cache 10*b*, and a control table of the user data is written. Hereinafter, the direction from the inner circumference toward the outer circumference of the disk 10 or the direction from the outer circumference toward the inner circumference of the disk 10 will be referred to as a radial direction. In the radial direction, the direction from the inner circumference toward the outer circumference is referred to as an outward direction (outside), and the direction from the outer circumference toward the inner circumference is referred to as an inward direction (inside). The direction orthogonal to the radial direction of the disk 10 is referred to as a circumferential direction. The circumferential direction corresponds to the direction along the circumference of the disk 10. Also, a particular position in the radial direction of the disk 10 may be referred to as a radial position, and a particular position in the circumferential direction of the disk 10 may be referred to as a circumferential position. The radial position and the circumferential position may be collectively simply referred to as positions. The disk 10 is sectioned into a plurality of regions (hereinafter, may be referred to as zones, zone regions, or subregions) each of which is in a particular range in the radial direction. The subregion includes a plurality of tracks. For example, the tracks are concentrically disposed on the disk 10. Note that the tracks are not required to be concentrically disposed on the disk 10. The track includes a plurality of sectors. Also, the regions sectioning the disk 10 in the radial direction may be referred to as radial regions. The radial region includes, for example, the zones (zone regions), the subregions, and the tracks. Note that the term "track" is used for: one region among a plurality of regions which section the disk 10 in the radial direction, a path of the head 15 at a particular radial position, data extending in the circumferential direction of the disk 10, data corresponding to one cycle written to a track at a particular radial position, data written to a track, part of the data written to a track, and/or various other meanings. The term "sector" is used for: one region among a plurality of regions which section the track in the circumferential direction, data written to a particular position of the disk 10, data written to a sector, and/or various other meanings. The phrase "track written to the disk 10" may be referred to as "write track", and the phrase "track read from the disk 10" may be referred to as "read track". The term "write track" may be simply referred to as "track", the term "read track" may be simply referred to as "track", and the terms "write track" and "read track" may be collectively referred to as "tracks". The phrase "radial-direction width of a track" may be referred to as "track width". The phrase "radial-direction width of a write track" may be referred to as "write-track width", and the phrase "radial-direction width of a read track" may be referred to as "read-track width". The term "write-track width" may be simply referred to as "track width", the term "read-track width" may be simply referred to as "track width", and the terms "write-track width and read-track width" may be collectively simply referred to as "track widths". The phrase "path passing through a center position of the track width of a particular track" will be referred to as "track center". The phrase "path passing through a center position of the write-track width of a particular write track" may be referred to as "write-track center", and the phrase "path passing through a center position of the read-track width of a read track" may be referred to as "read-track center". The term "write-track center" may be simply referred to as "track center", the term "read-track center" may be simply referred to as "track center", the terms "write-track center and read-track center" may be collectively simply referred to as "track centers".

The disk 10 includes a region (hereinafter, may be referred to as normal recording region) in which writing is carried out by a normal recording (conventional magnetic recording: CMR) type in which a track (hereinafter, may be referred to as an adjacent track) adjacent to a particular track in the radial direction is subjected to writing with a particular interval from the particular track in the radial direction, and a region (hereinafter, may be referred to as a shingled recording region) in which data is written by a shingled recording (shingled write magnetic recording: SMR or shingled write recording: SWR) type in which part of a particular track in the radial direction is overlapped with a next-written track. The term "adjacent" means, as a matter of course, a state in which, for example, data, objects, regions, and spaces are arranged in contact with each other and may also be used to mean a state in which they are arranged with a particular interval therebetween. The track density (track per inch: TPI) of the shingled recording region becomes higher than the track density of the recording region such as the normal recording region in which overlapped writing is not carried out. The shingled recording region has a region including a plurality of tracks continuously written in overlapped manner in one direction in the radial direction or a region (hereinafter, may be referred to as a band, a band region, or a physical band) in which a plurality of tracks are to be continuously written in one direction in the radial direction. Two band regions which are adjacent to each other in the radial direction are disposed with an interval (gap) therebetween. Also, each of the band regions has, for example, the same number (hereinafter, may be referred to as a track number) of tracks. In other words, each of the band regions has the same number of sectors (hereinafter, may be referred to as a sector number). The terms such as "the same", "identical", "match", and "equivalent" include, as a matter of course, the meaning that it is completely the same and also include the meaning that there is a difference by a degree that it can be considered to be practically the same. Note that each of the band regions may have, for example, a different track number of tracks. In other words, each of the band regions may have a different sector number of sectors. Hereinafter, "writing data in the normal recording type" may be simply referred to as "normal recording" or "normal recording processing", and "writing data in the shingled recording type" may be simply referred to as "shingled recording" or "shingled recording processing".

The head 15 has a slider as a main body and is provided with a write head 15W and a read head 15R mounted on the slider. The write head 15W writes data to the disk 10. The read head 15R reads the data written to the disk 10. Note that the term "write head 15W" may be simply referred to as "head 15", the term "read head 15R" may be simply referred to as "head 15", and the terms "write head 15W and read head 15R" may be collectively referred to as "heads 15". The phrase "center part of the head 15" may be referred to as "head 15", the phrase "center part of the write head 15W" may be referred to as "write head 15W", and the phrase "center part of the read head 15R" may be referred to as "read head 15R". The phrase "center part of the write head 15W" may be simply referred to as "head 15", and the phrase "center part of the read head 15R" may be simply referred to as "head 15". The act of "positioning the center part of the head 15 at the track center of a particular track"

may be expressed by, for example, "positioning the head 15 at a particular track", "disposing the head 15 at a particular track", or "positioning the head 15 at a particular track".

FIG. 2 is a schematic diagram showing an example of the disk 10 according to the present embodiment. As shown in FIG. 2, the direction in which the disk 10 rotates in the circumferential direction will be referred to as a rotation direction. Note that the rotation direction is counterclockwise in the example shown in FIG. 2, but may be in the opposite direction (clockwise). In FIG. 2, the disk 10 is sectioned into an inner circumferential region IR positioned in the inward direction, an outer circumferential region OR positioned in the outward direction, and an intermediate circumferential region MR positioned between the inner circumferential region IR and the outer circumferential region OR. For example, the inner circumferential region IR corresponds to a radial region which is from an innermost-circumference circumferential position of the disk 10 to a circumferential position which is distant from the innermost-circumference circumferential position by a particular distance in the outward direction. For example, the outer circumferential region OR corresponds to a radial region which is from an outermost-circumference circumferential position of the disk 10 to a circumferential position which is distant from the outermost-circumference circumferential position by a particular distance in the inward direction.

The disk 10 has a plurality of servo data regions SV. Hereinafter, the servo data region SV may be referred to as a servo pattern SV. The servo data regions SV extend radially in the radial direction of the disk 10 across a plurality of tracks and are disposed discretely with particular intervals in the circumferential direction. The servo data region SV has a plurality of servo sectors continuously disposed in the radial direction. The servo sector includes servo data for positioning the head 15 at a particular radial position, for example, a particular track of the disk 10. A region in which user data or the like is to be written (hereinafter, may be referred to as a data region) is disposed between the two servo data regions SV which are continuously arranged in the circumferential direction. Note that the servo data region SV may be a single spiral pattern from the inner circumference to the outer circumference of the disk 10.

In the example shown in FIG. 2, the user data region 10a, the media cache 10b, and the system area 10c are arranged from the inward direction toward the outward direction in the disk 10. The user data region 1a is disposed from the inner circumferential region 18 to the outer circumferential region OR. The user data region 10a corresponds to the shingled recording region. The user data region 10a of the disk 10 is sectioned into a plurality of subregions SBR in the radial direction. The subregion SBR includes at least one band region. A logical address such as logical block address (LBA) is allocated to each physical address such as each sector of the user data region 10a. The media cache 10b is adjacent to the outward direction of the user data region 10a. The media cache 10b is disposed in the outer circumferential region OR. The media cache 10b corresponds to a normal recording region. The system area 10c is adjacent to the outward direction of the media cache 10b. Note that the media cache 10b may be positioned in the inner circumferential region IR or in the intermediate circumferential region MR. The media cache 10b may be disposed in the user data region 10a. Also, the media cache 10b may be positioned in a dispersed manner in the outer circumferential region OR, intermediate circumferential region MR, and the inner circumferential region IR. The system area 10c is disposed in the outer circumferential region OR. The system area 10c corresponds to a normal recording region.

The driver IC 20 controls drive of the SPM 12 and the VCM 14 in accordance with control by the system controller 150 (more specifically, a CPU 50 described later).

The head amplifier IC (preamplifier) 30 is provided with, for example, a read amplifier and a write driver. The read amplifier amplifies a read signal read from the disk 10 and outputs the signal to the system controller 150 (more specifically, a read/write (R/W) channel 60 described later). The write driver outputs a write current to the head 15 in accordance with the signal output from the R/W channel 60.

The volatile memory 110 is a semiconductor memory which loses the data saved therein when power supply is shut down. The volatile memory 110 stores data or the like which is necessary for processing in each unit of the magnetic disk device 1. The volatile memory 10 is, for example, a dynamic random access memory (DRAM) or a synchronous dynamic random access memory (SDRAM).

The non-volatile memory 120 is a semiconductor memory which records the data saved therein even when power supply is shut down. The non-volatile memory 120 is, for example, a flash read only memory (flash ROM, FROM) of a NOR type or a NAND type.

The buffer memory 130 is a semiconductor memory which temporarily records data or the like transmitted/received between the magnetic disk device 1 and the host 200. Note that the buffer memory 130 may be integrated with the volatile memory 110. The buffer memory 130 is, for example, a DRAM, a static random access memory (SRAM), an SDRAM, a ferroelectric random access memory (FeRAM), a magnetoresistive random access memory (MRAM), or the like.

The system controller (controller) 150 is realized by using, for example, a large-scale integrated circuit (LSI) called system-on-a-chip (SoC) in which a plurality of elements are integrated on a single chip. The system controller 150 includes: a CPU bus 40; a central processing device (central processing unit: CPU), a microprocessor, or a microprocessing unit (MPU) 50; the read/write (R/W) channel 60; a gate array 70; and a hard disk controller (HDC) 80. The CPU 50, the read/write (R/W) channel 60, the gate array 70, and the hard disk controller (HDC) 80 are mutually electrically connected via the CPU bus 40. In other words, each of the CPU 50, the read/write (R/W) channel 60, the gate array 70, and the hard disk controller (HDC) 80 is connected to the CPU bus 40. The system controller 150 is electrically connected to, for example, the driver IC 20, the head amplifier IC 30, the volatile memory 110, the non-volatile memory 120, the buffer memory 130, and the host 200.

The CPU bus 40 is electrically connected to, for example, the CPU 50, the read/write (R/W) channel 60, the gate array 70, the hard disk controller (HDC) 80, the volatile memory 110, and the non-volatile memory 120.

The CPU 50 is a main controller which controls each of the units of the magnetic disk device 1. The CPU 50 executes control of activation, stop, and rotation speed maintenance of the SPM 12 via the driver IC 20. The CPU 50 controls the VCM 14 via the driver IC 20 and executes positioning of the head 15. The CPU 50 positions the head 15 at a particular position of the disk 10 when the SPM 12 is in a steady rotation state. The CPU 50 controls the operation of writing data to the disk 10 and selects the destination to save the write data transferred from the host 200. Also, the CPU 50 controls the operation of reading data from the disk 10 and controls processing of the read data transferred from the disk 10 to the host 200. Also, the CPU 50 controls the regions to record data. The CPU 50 is connected to each of the units of the magnetic disk device 1. The CPU 50 is connected to, for example, the driver IC 20 and the head amplifier IC 30. The CPU 50 is electrically connected to, for example, the R/W channel 60, the gate array 70, the HDC 80, the volatile memory 110, and the non-volatile memory 120 via the CPU bus 40. For example, the CPU 50 has a memory (or a memory space) to which a register for controlling, for example, the R/W channel 60, the gate array 70, and the HDC 80 is allocated. The CPU 50 controls, for example, the R/W channel 60, the gate array 70, and the HDC 80, for example, by executing recording or reading with respect to the register allocated to the memory for controlling, for example, the R/W channel 60, the gate array 70, and the HDC 80. Also, the CPU 50 may control each of the units of the magnetic disk device 1 such as the R/W channel 60, the gate array 70, and the HDC 80 by a circuit or may control each of the units of the magnetic disk device 1 such as the R/W channel 60, the gate array 70, and the HDC 80 by firmware.

The R/W channel 60 executes signal processing of read data and write data in accordance with instructions from the CPU 50. The R/W channel 60 has a circuit or a function to modulate write data. Also, the R/W channel 60 has a circuit or a function to measure the signal quality of read data. The R/W channel. 60 has, for example, a servo block 610, which executes the signal processing necessary for positioning processing of the head 15, and a read/write block 620, which executes the signal processing of read data and write data. In read processing, the R/W channel 60 separates an analog signal (read data or read signal), which has been amplified by the head amplifier IC 30, into a servo signal (read data or read signal) and a data signal (read data or read signal). The read/write block 620 executes decoding processing with respect to the data signal and outputs the data signal, which has undergone execution of the decoding processing, to the HDC 80. In write processing, the R/W channel 60 executes encoding processing with respect to the write data, which has been input from the HDC 80, and outputs the write data, which has undergone execution of the encoding processing, to the head amplifier IC 30. The R/W channel 60 is electrically connected to, for example, the head amplifier IC 30, the gate array 70, and the HDC 80. The R/W channel 60 is electrically connected to, for example, the CPU 50, the gate array 70, the HDC 80, the volatile memory 110, and the non-volatile memory 120 via the CPU bus 40.

The gate array 70 generates signals for controlling each of the units of the magnetic disk device 1 in accordance with instructions from the CPU 50. For example, in read processing, the gate array 70 processes the read data, which has been input from the R/W channel 60 and undergone execution of decoding processing, to generate a control signal for generating data to be transferred to the host 200 and outputs the generated control signal to the HDC 80. In write processing, the gate array 70 generates a control signal, which causes write data to be output to the R/W channel. 60, and outputs the generated control signal to the HDC 80. The gate array 70 is electrically connected to, for example, the R/W channel 60 and the HDC 80. The gate array 70 is electrically connected to, for example, the CPU 50, the R/W channel 60, the HDC 80, the volatile memory 110, and the non-volatile memory 120 via the CPU bus 40.

The HDC 80 controls data transfer between the host 200 and the R/W channel 60 in accordance with, for example, instructions from the CPU 50 and the control signal from the gate array 70. The HDC 80 has, for example, a host block 810, a buffer block 820, and a read/write block 830. The host block 810 controls an interface with the host 200. The buffer block 820 controls the buffer 130. The read/write block 830 controls read processing and write processing. In read processing, the HDC 80 processes the read data, which has been input from the R/W channel 60 and undergone execution of decoding processing, to generate the data to be transferred to the host 200 in accordance with the control signal from the gate array 70, once stores the generated data in the buffer memory 130, and then transfers the data to the host 200. In write processing, the HDC 80 outputs write data, which has been transferred from the host 200 and once stored in the buffer memory 130, to the R/W channel 60 in accordance with the control signal from the gate array 70. The HDC 80 is electrically connected to, for example, the R/W channel 60, the gate array 70, and the buffer memory 130. The HDC 80 is electrically connected to, for example, the CPU 50, the R/W channel 60, the gate array 70, the volatile memory 110, and the non-volatile memory 120 via the CPU bus 40. The HDC 80 is also electrically connected to the host 200.

The system controller 150 controls read processing and write processing of data in accordance with, for example, commands from the host 200. The system controller 150 controls the VCM 14 via the driver 1C 20 to dispose the head 15 at a particular radial position on the disk 10 and execute read processing and write processing. Hereinafter, the terms "write processing" and "read processing" may be collectively expressed by the term "access" or "access processing".

The system controller 150 executes normal recording in accordance with, for example, a command from the host 200. The system controller 150 carries out normal recording of data on the media cache 10b and the system area 10c of the disk 10 in accordance with, for example, the command from the host 200. The system controller 150, for example, randomly and sequentially carries out normal recording of data on the media cache 10b and the system area 10c. The system controller 150, for example, subjects a plurality of tracks to normal recording at a particular track pitch (hereinafter, may be referred to as a normal-recording track pitch) on the disk 10. Hereinafter, the act of "sequentially writing data" may be referred to as "sequential write".

The system controller 150 executes shingled recording in accordance with, for example, a command from the host 200. The system controller 150 records data by shingled recording in the user data region 10a of the disk 10 in accordance with, for example, a command from the host 200. The system controller 150, for example, sequentially records data by shingled recording in each band region in the user data region 10a. The system controller 150, for example, subjects a plurality of tracks to shingled recording at a particular track pitch (hereinafter, may be referred to as a shingled-recording track pitch) in the user data region 103. The shingled-recording track pitch is, for example, smaller than the normal-recording track pitch.

Figure 3:
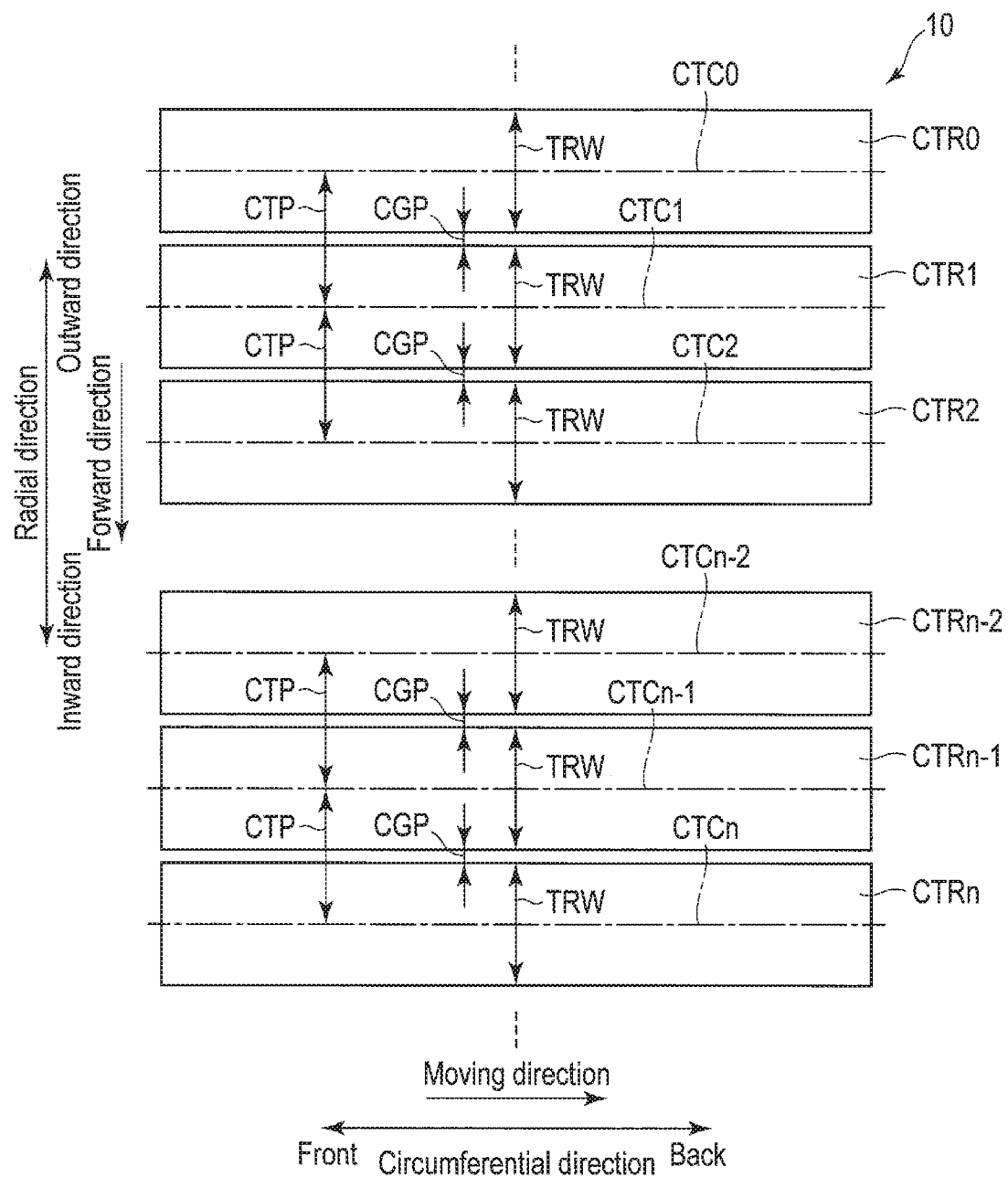
FIG. 3 is a schematic diagram showing an example of normal recording processing.

FIG. 3 is a schematic diagram showing an example of normal recording processing. As shown in FIG. 3, the direction to sequentially write and read data in the radial direction will be referred to as a forward direction. In FIG. 3, the forward direction is the inward direction. Note that the forward direction may be the outward direction. As shown in FIG. 3, the direction in which the head 15 moves, in other words, the direction to carry out read/write with respect to the disk 10 in the circumferential direction may be referred to as a moving direction. In the example shown in FIG. 3, the moving direction is a backward direction of the circumferential direction. Note that the moving direction may be a frontward direction of the circumferential direction which is the opposite direction of the backward direction. FIG. 3 shows a track CTR0, a track CTR1, a track CTR2, . . . , a track CTRn-2, a track CTRn-1, and a track CTRn. In FIG. 3, the tracks CTR0 to CTRn are arranged in the described order from the outward direction to the inward direction.

FIG. 3 shows a track center CTC0 of the track CTR0 having a track width TRW, a track center CTC1 of the track CTR1 having the track width TRW, a track center CTC2 of the track CTR2 having the track width TRW, . . . , a track center CTCn-2 of the track CTRn-2 having the track width TRW, a track center CTCn-1 of the track CTRn-1 having the track width TRW, and a track center CTCn of the track CTRn having the track width TRW. Note that the track widths of the tracks CTR0 to CTRn may be different.

In the example shown in FIG. 3, each of the tracks CTR0 to CTRn is disposed at a normal-recording track pitch CTP in the radial direction. For example, the track center CTC0 of the track CTR0 and the track center CTC1 of the track CTR1 are distant from each other by the normal-recording track pitch CTP in the radial direction, and the track center CTC1 of the track CTR1 and the track center CTC2 of the track CTR2 are distant from each other by the normal-recording track pitch CTP in the radial direction. Also, for example, the track center CTCn-2 of the track CTRn-2 and the track center CTCn-1 of the track CTRn-1 are distant from each other by the normal-recording track pitch CTP in the radial direction, and the track center CTCn-1 of the track CTRn-1 and the track center CTCn of the track CTRn are distant from each other by the normal-recording track pitch CTP in the radial direction. Note that each of the tracks CTR0 to CTRn may be disposed at a different track pitch (normal-recording track pitch) in the radial direction.

Also, in the example shown in FIG. 3, each of the tracks CTR0 to CTRn is disposed with a gap CGP in the radial direction. For example, the track CTR0 and the track CTR1 are distant from each other by the gap CGP in the radial direction, and the track CT1 and the track CTR2 are distant from each other by the gap CGP in the radial direction. Also, the track CTRn-2 and the track CTRn-1 are distant from each other by the gap CGP in the radial direction, and the track CTRn-1 and the track CTRn are distant from each other by the gap CGP in the radial direction. Note that each of the tracks CTR0 to CTRn may be disposed with a different gap. In FIG. 3, for the sake of convenience, each of the tracks is shown for a rectangular shape extending in the circumferential direction with a particular track width, but is actually curved along the circumferential direction. Also, each of the tracks may have a wavelike shape extending in the circumferential direction as the shape is varied in the radial direction.

In the example shown in FIG. 3, the system controller 150 positions the head 15 at the track center CTC0 and subjects the track CTR0 to normal recording in the normal recording region of the disk 10. The system controller 150 positions the head 15 at the track center CTC1, which is distant from the track center CTC0 of the track CTR0 in the inward direction by the normal-recording track pitch CTP, and subjects the track CTR1 to normal recording in the normal recording region of the disk 10. The system controller 150 positions the head 15 at the track center CTC2, which is distant from the track center CTC1 of the track CTR1 in the inward direction by the normal-recording track pitch CTP, and subjects the track CTR2 to normal recording in the normal recording region of the disk 10.

In the example shown in FIG. 3, the system controller 150 positions the head 15 at the track center CTCn-1, which is distant from the track center CTCn-2 of the track CTRn-2 in the inward direction by the normal-recording track pitch CTP, and subjects the track CTRn-1 to normal recording in the normal recording region of the disk 10. The system controller 150 positions the head 15 at the track center CTCn, which is distant from the track center CTCn-1 of the track CTRn-1 in the inward direction by the normal-recording track pitch CTP, and subjects the track CTRn to normal recording in the normal recording region of the disk 10.

In the example shown in FIG. 3, the system controller 150 may sequentially subject the tracks CTR0, CTR1, CTR2, . . . , CTRn-2, CTRn-1, and CTRn to normal recording in the normal recording region of the disk 10 or may randomly subject particular sectors of the tracks CTR0, CTR1, CTR2, . . . , CTRn-2, CTRn-1, and CTRn to normal recording.

FIG. 4 is a schematic diagram showing an example of shingled recording processing. FIG. 4 shows a particular band region BA of the user data region 10a. In the example shown in FIG. 4, the band region BA includes tracks STR0, STR1, STR2, . . . , STRn-1, and STRn. In FIG. 4, the tracks STR0 to STRn are arranged in the described order from the outward direction to the inward direction. In FIG. 4, the tracks STR0 to STRn are written in overlapped manner in the forward direction.

In FIG. 4, regarding the tracks STR0 to STRn, the track STR0 written on the disk 10 by the write head 15W may be referred to as a write track WT0, the track STR1 written on the disk 10 by the write head 15W may be referred to as a write track WT1, the track STR2 written on the disk 10 by the write head 15W may be referred to as a write track WT2, the track STRn-1 written on the disk 10 by the write head 15W may be referred to as a write track WTn-1, and the track STRn written on the disk 10 by the write head 15W may be referred to as a write track WTn.

FIG. 4 shows a track center STC0 of the write track WT0 (track STR0) having a write-track width WTW, a track center STC1 of the write track WT1 (track STR1) having the write-track width WTW, a track center STC2 of the write track WT2 (track STR2) having the write-track width WTW, . . . , a track center STCn-1 of the write track WTn-1 (track STRn-1) having the write-track width WTW, and a track center STCn of the write track WTn (track STRn) having the write-track width WTW. Note that the write-track widths of the write tracks WT0 to WTn may be different.

In the example shown in FIG. 4, each of the write tracks WT0 (track STR0) to WTn (STRn) are disposed at a shingled-recording track pitch WTP in the radial direction. For example, the track center STC0 of the write track WT0 and the track center STC1 of the write track WT1 are distant from each other in the radial direction by the shingled-recording track pitch WTP. For example, the track center STC1 of the write track WT1 and the track center STC2 of the write track WT2 are distant from each other in the radial direction by the shingled-recording track pitch WTP. Also, for example, the track center STCn-1 of the write track WTn-1 and the track center STCn of the write track WTn are distant from each other in the radial direction by the shingled-recording track pitch WTP. Note that each of the write track WT0 (track STR0) to the write track WTn (track STRn) may be disposed at a different track pitch (shingled-recording track pitch) in the radial direction.

Also, the write track WT0 (track STR0) to the write track WTn (track STRn) are written in the overlapped manner in the forward direction. The remaining region of the write track WT0 after excluding the region overlapped with the write track WT1 will be referred to as a read track RT0 (track STR0), the remaining region of the write track WT1 after excluding the region overlapped with the write track WT2 will be referred to as a read track RT1 (track STR1), and the remaining region of the write track WTn−1 after excluding the region overlapped with the write track WTn will be referred to as a read track RTn−1. (track STRn−1). Also, the write track (hereinafter, may be referred to as a final track) WTn, which is written at the end and is not overlapped with another write track when write is sequentially carried out in the forward direction in the band region BA, may be referred to as a write track WTn (final track). FIG. 4 shows a read-track width RTW1 of the read tracks RT0 to RTn−1. In FIG. 4, a read-track width RTW2 of the read track RTn is the same as the write-track width WTW of the write track WTn. The read-track width RTW1 is narrower than the write-track width WTW. Note that the read-track widths of the read tracks RT0 to RTn−1 may be different. In FIG. 4, for the sake of convenience, each of the tracks is shown in a rectangular shape extending in the circumferential direction with a particular track width, but is actually curved along the circumferential direction. Also, each of the tracks may have a wavelike shape extending in the circumferential direction as the shape is varied in the radial direction.

In the example shown in FIG. 4, the system controller 150 sequentially records the write track WT0, the write track WT1, the write track WT2, . . . , the write track WTn−1, and the write track WTn by shingled recording in the described order toward the forward direction in the particular band region BA of the user data region 10a. In other words, the system controller 150 subjects the track STR0 (write track WT0), the track STR1 (write track WT1), the track STR2 (write track WT2), . . . , the track STRn−1 (write track WTn−1), and the track STRn (write track WTn) to overlapped writing in the forward direction in the described order in the particular band region BA of the user data region 10a.

In the example shown in FIG. 4, the system controller 150 positions the head 15 at the track center STC1, which is distant from the track center STC0 of the write track WT0 (track STR0) by the shingled-recording track pitch WTP in the forward direction, and records the write track WT1 by shingled recording in the write track WT0 in the particular band region BA of the user data region 10a. The system controller 150 positions the head 15 at the track center STC2, which is distant from the track center STC1 of the write track WT1 by the shingled-recording track pitch WTP in the forward direction, and records the write track WT2 by shingled recording in the write track WT1 in the particular band region BA of the user data region 10a. The system controller 150 positions the head 15 at the track center STCn, which is distant from the track center STCn−1 of the write track WTn−1 by the shingled-recording track pitch WTP in the forward direction, and records the write track (final track) WTn by shingled recording in the write track WTn−1 in the particular band region BA of the user data region 10a.

The system controller 150 sections each of the subregions SBR into at least one band region (physical band) BA. The system controller 150 allocates (or gives) a physical band number to the at least one band region BA sectioned in each subregion SBR. Also, the system controller 150 allocates (or gives) a logical band number to the at least one band region BA sectioned in each subregion SBR. Hereinafter, "a band region or a physical band to which a particular logical band number is allocated" may be referred to as "logical band". The system controller 150 allocates LBA to each sector of each logical band in accordance with the order of logical band numbers. Therefore, the correspondence relation between the logical band and LBA does not change. For example, when each of the physical bands has the same number of sectors, the system controller 150 allocates the same number (hereinafter, may be referred to as an address number) of LBA to each logical band. The system controller 150 sets, as a backup band region (hereinafter, may be referred to as a spare band), at least one band region (physical band) BA in at least one band region BA sectioned in each subregion SBR. The system controller 150 does not allocate the logical band number and LBA to the spare band. Therefore, the address number of LBA allocated to one subregion SBR corresponds to "('the number of physical bands BA of the subregion SBR'−1)×'the number of sectors per physical band BA'". The system controller 150 can arbitrarily change the correspondence relation between the band regions (physical bands) BA and the logical band numbers in each subregion SBR. Therefore, the correspondence relations between the physical bands and LBAs change. Note that the correspondence relations between the physical bands BA and LBAs change only in the subregion SBR. Therefore, the range of the LBAs allocated to each subregion does not change. For example, the system controller 150 may record the correspondence relations of the physical bands (or physical band numbers) to the logical bands (or logical band numbers) and the spare band as a table in a particular recording region such as the system area 10c, the volatile memory 110, or the non-volatile memory 120 of the disk 10. For example, the system controller 150 changes (rewrites) the table of the correspondence relations of the physical bands to the logical bands and the spare band, thereby changing the correspondence relations of the physical bands to the logical bands and the spare band.

When the data written to a physical band (hereinafter, may be referred to as a target band region or a target physical band) corresponding to a particular logical band (hereinafter, may be referred to as a target band region or a target logical band) is to be updated (rewritten) to other data (hereinafter, may be referred to as update data), the system controller 150 writes the update data to the physical band corresponding to the spare band instead of directly writing the update data to the target physical band. Hereinafter, "processing of updating or rewriting the data of a particular region such as a particular band region (physical band or logical band)" may be referred to as "data update". When the write of the update data to the physical band corresponding to the spare band is finished, the system controller 15C allocates the logical band number (hereinafter, may be referred to as a target logical band number), which corresponds to the target logical band, to the physical band, which corresponds to the spare band to which the update data has been written, to change the physical band, which corresponds to the spare band, to a new target logical band, thereby changing the physical band, which corresponds to the target logical band, to a new spare band. In other words, when the write of the update data to the physical band corresponding to the spare band is finished, the system controller 150 switches the physical band, which corresponds to the spare band to which the update data has been written, with the physical band, which corresponds to the target logical band.

For example, in a case in which the update data is directly written to the target physical band, when rewriting of data is interrupted in the middle of the update band, at least the data written in the forward direction may be erased (or lost) due to, for example, leakage flux from the head 15. However, as described above, by writing the update data to the spare band and switching the spare band with the target logical band instead of directly writing the update data to the target physical band, the data of the target physical band can be prevented from being lost by sudden power shut down while the update data is being directly written to the target physical band.

Figure 5:
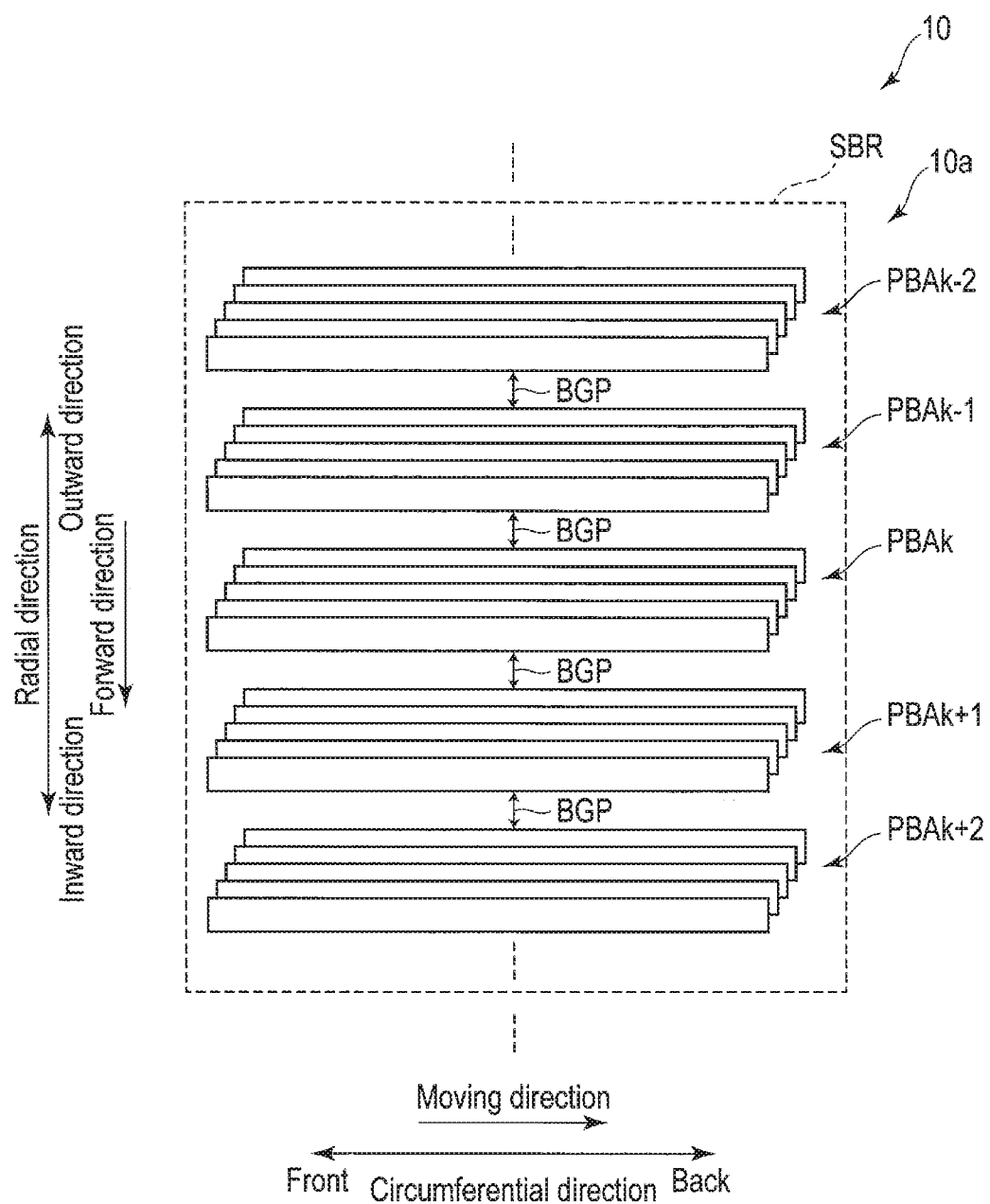
FIG. 5 is a schematic diagram showing an example of a subregion.

FIG. 5 is a schematic diagram showing an example of the subregion SBR. FIG. 5 shows a particular subregion SBR of the user data region 10a. The subregion SBR includes a plurality of band regions (physical bands) PBAk−2, PBAk−1, PBAk, PBAk+1, and PBAk+2. Hereinafter, PBAk−2, PBAk−1, PBAk, PBAk+1, and PBAk+2 may be referred to as physical band numbers. Each of the band regions PBAk−2, PBAk−1, PBAk, PBAk+1, and PBAk+2 includes the same number of sectors. In other words, the address number of LBA allocated to each of PBAk−2, PBAk−1, PBAk, PBAk+1, and PBAk+2 is the same. The band regions (physical bands) PBAk−2, PBAk−1, PBAk, PBAk+1, and PBAk+2 are arranged from the outward direction toward the inward direction with gaps BGP therebetween. Since the band regions (physical bands) PBAk−2, PBAk−1, PBAk, PBAk+1, and PBAk+2 are arranged, for example, with the gaps BGP, the influence of, for example, leakage flux caused by write processing of data to the band region (hereinafter, may be referred to as an adjacent band region or an adjacent band) BA which is adjacent in the radial direction can be suppressed. In FIG. 5, for the sake of convenience, each of the tracks of the band regions PBAk−2, PBAk−1, PBAk, PBAk+1, and PBAk+2 is shown in a rectangular shape extending in the circumferential direction with a particular track width, but is actually curved along the circumferential direction. Also, each of the tracks of the band regions PBAk−2, PBAk−1, PBAk, PBAk+1, and PBAk+2 may have a wavelike shape extending in the circumferential direction as the shape is varied in the radial direction. Note that the five band regions PBAk−2 to PBAk+2 are disposed in the subregion SBR in FIG. 5, but four or less band regions may be disposed therein, or six or more band regions may be disposed therein. Also, five tracks are written in overlapped manner in each of the band regions PBAk−2 to PBAk+2, but four or less tracks may be written therein in overlapped manner, or six or more tracks may be written therein in overlapped manner.

In the example shown in FIG. 5, the system controller 150 sections the band regions PBAk−2, PBAk−1, PBAk, PBAk+1, and PBAk+2 in the particular subregion SBR of the user data region 10a.

FIG. 6 is a diagram showing an example of a table TB1 of the correspondence relations of physical bands to logical bands and a spare band. FIG. 6 corresponds to FIG. 5. In FIG. 6, the table TB1 includes physical band numbers and logical band numbers. The table TB1 of FIG. 6 shows the physical band numbers PBAk−2, PBAk−1, PBAk, PBAk+1, and PBAk+2. The table TB1 of FIG. 6 shows the logical band numbers LBAk−2, LBAk−1, LBAk, and LBAk+1. Hereinafter, the logical band numbers may be described as logical bands LBAk−2, LbAk−1, LBAk, and LBAk+1. Also, the table TB1 of FIG. 6 shows the spare band SBA. Note that the table TB1 includes the four logical band numbers LBAk−2, LBAk−1, LBAk, and LBAkt+1 in FIG. 6, but may include three or less logical band numbers or may include five or more logical band numbers depending on the number of the physical band numbers.

In the example shown in FIG. 6, in the table TB1, the system controller 150 allocates the logical band number LBAk−2 to the band region PBAk−2 of the physical band number PBAk−2 and allocates the logical band number LBAk−1 to the band region PBAk−1 of the physical band number PBAk−1. Also, in the table TB1, the system controller 150 allocates the logical band number LBAk to the band region PBAk of the physical band number PBAk and allocates the logical band number LBAk+1 to the band region PBAk1 of the physical band number PBAk+1. Also, the system controller 150 sets the band region PBAk+2 of the physical band number PBAk+2 as the spare band SBA in the table TB1.

FIG. 7 is a schematic diagram showing an example of data update processing of a particular logical band. FIG. 7 corresponds to FIG. 5 and FIG. 6.

The system controller 150 executes data update processing with respect to the logical band PBAk−1 in the table TB1 of FIG. 6. The system controller 150 records update data by shingled recording to the physical band PBAk+2 corresponding to the spare band SBA in the table TB1 of FIG. 6. When the write of the update data to the physical band PBAk+2 is completed, as shown in the table TB1 of FIG. 7, the system controller 150 allocates the logical band number LBAk−1 to the physical band PBAk+2 to change the physical band PBAk+2 to a new logical band LBAk−1 and sets the physical band PBAk−1 as a new spare band SBA.

The system controller 150 carries out management by fixedly allocating identification numbers (hereinafter, may be referred to as media caches LBA) to sectors of the media cache 10b. The system controller 150, for example, writes data (hereinafter, referred to as block data or sector data) in the order, in which the data is transferred from the host 200 or the like, to the sectors in the order from the sector having a small media cache LBA to the sector having a large media cache LBA. The capacity of the data written to the media cache 10b (hereinafter, may be referred to as a data volume or a usage volume) corresponds to the difference value between the media cache LBA of the sector to which the oldest block data among a plurality of pieces of block data written to the media cache 10b is written (hereinafter, may be referred to as a head media cache LBA) and the media cache LBA of the sector subsequent to the media cache LBA of the sector to which the newest block data is written (hereinafter, may be referred to as a tail-end media cache LBA). The term "head" includes meanings such as "being allocated with the smallest number among allocated numbers" and "being the oldest among a plurality of ones recorded in order". The term "tail end" includes meanings such as "being allocated with the largest number among allocated bands" and "being the newest among a plurality of ones recorded in order". The system controller 150, for example, writes (or moves) the old block data to the newest block data among the block data, which has been written to the sectors of the media cache 10b, in the order to the user data region 10a.

Note that the system controller 150 does not necessarily move the oldest block data to the newest block data among the block data, which has been written to the sectors of the media cache 10b, in the order to the user data region 10a. For example, the system controller 150 moves the second oldest block data among the block data, which has been written to the media cache 10b, to the user data region 10a. For example, the usage volume of the media cache 10b in the case in which the block data other than the oldest block data is moved to the user data region 10a is approximately the same in appearance as the usage volume of the media cache 10b in the case in which the block data is not moved to the user data region 10a. In other words, in the case in which the block data other than the oldest block data is moved to the user data region 10a, the usage volume of the media cache 10b in appearance does not change. When increase of the usage volume of the media cache during operation excessively reduces the vacancy capacity of the media cache 10*b*, the system controller 150 has to generate a vacancy capacity when block data is received, and the responsiveness with respect to commands from the host 200 or the like (hereinafter, may be referred to as command responsiveness) reduces. Therefore, the system controller 150 executes control of appropriately writing (moving) the block data, which has been written to the media cache 10*b*, to the user data region 10*a* so that the usage volume of the media cache 10*b* does not become excessively large.

For example, when block data is not written in the sectors of the media cache 10*b* or when there is no block data to be written (or moved) from the media cache 10*b* to the user data region 10*a*, the system controller 150 writes the block data, which has been transferred from the host 200 or the like, to the sector (hereinafter, may be referred to as a smallest media cache sector) to which the smallest media cache LBA (hereinafter, may be referred to as the smallest media cache LBA) is allocated. When block data has been written to the sector (hereinafter, may be referred to as the largest media cache sector) to which the biggest media cache LBA (hereinafter, may be referred to as the largest media cache LBA) is allocated, the system controller 150 writes the block data, which has been transferred from the host 200 or the like, to the smallest media cache sector. As described above, the media cache 10*b* is used, for example, as a first in first out (FIFO) of a ring buffer.

The system controller 150 adds a header to every particular number of pieces of block data (hereinafter, may be referred to as a block data group).

Hereinafter, at least one piece of block data which is a data group to which a header is added may be referred to as a data group. The header includes information such as: the LBA (hereinafter, may be referred to as an in-data-group head LBA) of the sector (hereinafter, may be referred to as an in-data-group head sector) to which the oldest block data (hereinafter, may be referred to as in-data-group head data) in the data group is written, the number of pieces of block data included in the data group (hereinafter, may be referred to as an in-data-group sector number or an in-data-group block number), and the media cache LBA allocated to the in-data-group head sector (hereinafter, may be referred to as an in-data-group head media cache (MC) LBA).

The system controller 150 writes data groups to the media cache 10*b*, for example, in the order that the data groups are transferred from the host 200 or the like. The system controller 150, for example, writes (or moves) data groups to the user data region 10*a* in the order from the old data group among the data groups written in the media cache 10*b*.

FIG. 8 is a schematic diagram showing an example of the media cache 10*b*. In FIG. 8, the media cache 10*b* includes a data group DGn, a data group DGn+1, and a data group DGn+2. In FIG. 8, the data group DGn, the data group DGn+1, and the data group DGn+2 are written to the media cache 10*b* in the described order. In other words, in FIG. 8, the data group DGn is written to the media cache 10*b* before the data group DGn+1, and the data group DGn+1 is written to the media cache 10*b* before the data group DGn+2. Hereinafter, the fact of being previous in terms of time may be expressed by "before", and the fact of being later in terms of time may be expressed by "after". Also, the fact of being a previous order of a particular order may be expressed by "before", and the fact of being behind in order of a particular order may be expressed by "after". The data group DGn has a header HDRn and a block data group BDGn. The data group DGn+1 has a header HDRn+1 and a block data group BDGn+1. The data group DGn+2 has a header HDRn+2 and a block data group BDGn+2. FIG. 8 shows a head media cache LBA LmB and a tail-end media cache LBA LmE. Also, FIG. 8 shows a media cache LBA Lmn, a media cache LBA Lm(n+1) larger than the media cache LBA Lmn, and a media cache LBA Lm(n+2) larger than the media cache LBA Lm(n+1). In FIG. 8, the media cache 10*b* is illustrated to include only the three data groups of the data group DGn, the data group DGn+1, and the data group DGn+2, but the media cache 10*b* may include two or less data groups or may include four or more data groups. In FIG. 8, for the sake of convenience, the media cache 10*b* is shown in a rectangular shape extending in the circumferential direction with a particular width, out is actually curved along the circumferential direction. Also, the media cache 10*b* is illustrated to include only one track in FIG. 8, but may include a plurality of tracks.

In the example shown in FIG. 8, the system controller 150 writes data groups to the media cache 10*b* in the order that the data groups DGn, DGn+1, and DGn+2 are transferred from the host 200 or the like. The system controller 150 adds the header HDRn to the data group BDGn and writes the data group DGn from the sector to which the media cache LBA Lmn is allocated to the sector which is before the sector to which the media cache LBA Lm(n+1) is allocated. Subsequent to the data group DGn, the system controller 150 writes the data group DGn+1 to the media cache 10*b*. The system controller 150 adds the header HDRn+1 to the block data group BDGn+1 and writes the data group DGn+1 from the sector to which the media cache LBA Lm(n+1) is allocated to the sector which is before the sector to which the media cache LBA Lm(n+2) is allocated. Subsequent to the data group DGn+1, the system controller 150 writes the data group DGn+2 to the media cache 10*b*. The system controller 150 adds the header HDRn+2 to the data group BDGn+2 and writes the data group DGn+2 from the sector to which the media cache LBA Lm(n+2) is allocated to the sector which is before the sector to which the tail-end media cache LBA LmE is allocated. In the example shown in FIG. 8, the data capacity of the media cache 10*b* corresponds to the difference value between the head media cache LBA LmB and the tail-end media cache LBA LmE.

The system controller 150 controls the correspondence relations of, for example, the data groups written to the media cache 10*b*, LBA, and media caches LBA by, for example, tables (hereinafter, may be referred to as media-cache control tables). The media-cache control tables include a main table and an extension table. Each entry corresponding to each data group of the main table includes, for example, a data group (may be referred to as an entry number or a data-group entry number), an in-data-group head LBA, an in-data-group sector number, an in-data-group head MCLBA, and an extension index corresponding to the information of a link to the extension table showing the disposition information of the sectors to which valid block data or data is written in the data group (hereinafter, may be referred to as valid sectors). Note that each entry corresponding to each data group of the main table is not required to include a data group (or an entry number). For example, each entry of the main table represents that the sectors (hereinafter, may be simply referred to as sectors) to which block data corresponding to the in-data-group sector number is written from the in-data-group head sector to which the in-data-group head LBA is allocated in the data group corresponding to the entry are disposed with, at the head, the sector to which the head media cache LBA is allocated. The system controller 150 may record the media-cache control tables (the main table and the extension table) in a particular recording region such as the system area 10c of the disk 10, the volatile memory 110, or the non-volatile memory 120.

When it is determined that only some of the sectors are valid sectors among the sectors corresponding to the in-data-group sector number continuously disposed from the in-data-group head sector in a particular data group, the system controller 150 records, in the extension table, the disposition information of the valid sectors among the sectors corresponding to the in-data-group sector number continuously disposed from the in-data-group head sector in this data group. In other words, when it is determined that some of the sectors are the sectors to which invalid block data has been written or the sectors to which data has not been written (hereinafter, may be referred to as invalid sectors) among the sectors corresponding to the in-data-group sector number continuously disposed from the in-data-group head sector in a particular data group, the system controller 150 records, in the extension table, the disposition information of the valid sectors among the sectors corresponding to the in-data-group sector number continuously disposed from the in-data-group head sector in this data group. For example, an entry of the extension table corresponding to a particular data group includes: an entry number (hereinafter, may be referred to as an extension entry number) corresponding to an extension index of the main table, an LBA offset representing the sector number (difference between the in-data-group head sector and the head valid sector) from the in-data-group head sector of this data group to the head sector of at least one continuously disposed valid sector (hereinafter, may be referred to as a head valid sector), and the sector number (hereinafter, may be referred to as a continuous valid sector number) corresponding to the number of the valid sectors continuously disposed from the head valid sector in the particular data group. For example, the extension table shows the disposition of valid sectors in a particular data group. When the disposition information of the valid sectors corresponding to the particular data group is recorded in the extension table, the system controller 150 records, in the extension index of the entry of the main table corresponding to this data group, the information of a link to a particular entry of the extension table recording the disposition information of the valid sectors corresponding to this data group. In other words, when it is determined that only some of the sectors are valid sectors among the sectors corresponding to the in-data-group sector number continuously disposed from the in-data-group head sector in a particular data group, the system controller 150 records, in the extension index of the entry of the main table corresponding to this data group, the information of the link to the particular entry of the extension table recording the disposition information of the valid sectors corresponding to this data group.

When all of the sectors corresponding to the in-data-group sector number continuously disposed from the in-data-group head sector in a particular data group are valid sectors, the system controller 150 records, in the extension index of the entry of the main table corresponding to this data group, the information to show all the sectors in the in-data-group are valid, in other words, the data such as FFFFh showing that the extension table is not necessary.

FIG. 9 is a schematic diagram showing an example of the main table TB2. FIG. 9 corresponds to, for example, FIG. 8. In the example shown in FIG. 9, each entry of the main table TB2 includes: a data group (entry number), an in-data-group head LBA, an in-data-group sector number, an in-data-group head MCLBA, and an extension index. The entry corresponding to the data group DGn of the main table TB2 includes: the data group (entry number) DGn, an in-data-group head LBA Ln, an in-data-group sector number NSn, an in-data-group head MCLBA Lmn, and an extension index En. The entry corresponding to the data group DGn+1 of the main table TB2 includes: the data group (entry number) Dn+1, an in-data-group head LBA Ln+1, an in-data-group sector number NSn+1, an in-data-group head MCLBA Lmn+1, and an extension index En+1. The entry corresponding to the data group DGn+2 of the main table TB2 includes: the data group (entry number) DGn+2, an in-data-group head LBA n+2, an in-data-group sector number NSn+2, an in-data-group head MCLBA Lmn+2, and an extension index En+2. For example, the in-data-group head LBA Ln is smaller than the in-data-group head LBA Ln+1. For example, the in-data-group head LBA Ln+1 is smaller than the in-data-group head LBA Ln+2. In other words, in the main table TB2, the in-data-group heads LBA Ln, Ln+1, and Ln+2 are arranged in ascending order. For example, the in-data-group head MCLBA Lmn+1 is smaller than the in-data-group head MCLBA Lmn+2. In FIG. 9, the main table TB2 is illustrated to include only the three entries corresponding to three data groups of the data group DGn, the data group DGn+1, and the data group DGn+2, but may include two entries corresponding to two or less data groups or may include four entries corresponding to four or more data groups.

In the example shown in FIG. 9, the system controller 150 records the in-data-group head LBA Ln, the in-data-group sector number NSn, and the in-data-group head MCLBA Lmn in the entry of the data group DGn of the main table TB2. When it is determined that only some of the sectors are valid sectors amount the sectors corresponding to the in-data-group sector number NSn continuously disposed from the in-data-group head sector to which the in-data-group head LBA Ln is allocated in the data group DGn, the system controller 150 records, in the extension index En of the entry of the main table TB2 corresponding to the data group DGn, the information of the link to the particular entry of the extension table recording the disposition information of the valid sectors corresponding to the data group DGn.

In the example shown in FIG. 9, the system controller 150 records the in-data-group head LBA Ln+1, the in-data-group sector number NSn+1, and the in-data-group head MCLBA Lmn+1 in the entry of the data group DGn+1 or the main table TB2. When it is determined that only some of the sectors are valid sectors among the sectors corresponding to the in-data-group sector number NSn+1 continuously disposed from the in-data-group head sector to which the in-data-group head LBA Ln+1 is allocated in the data group DGn+1, the system controller 150 records, in the extension index En+1 of the entry of the main table TB2 corresponding to the data group DGn+1, the information of the link to the particular entry of the extension table recording the disposition information of the valid sectors corresponding to the data group DGn+1.

In the example shown in FIG. 9, the system controller 150 records the in-data-group head LBA Ln+2, the in-data-group sector number NSn+2, and the in-data-group head MCLBA Lmn+2 in the entry of the data group DGn+2 of the main table TB2. When it is determined that only some of the sectors are valid sectors among the sectors corresponding to the in-data-group sector number NSn+2 continuously disposed from the in-data-group head sector to which the in-data-group head LBA Ln+2 is allocated in the data group DGn+2, the system controller 150 records, in the extension index En+2 of the entry of the main table TB2 corresponding to the data group DGn+2, the information of the link to the particular entry of the extension table recording the disposition information of the valid sectors corresponding to the data group DGn+2.

FIG. 10 is a schematic diagram showing an example of the extension table TB3. FIG. 10 corresponds to, for example, FIG. 8 and FIG. 9. In the example shown in FIG. 10, each entry of the extension table TB3 includes an entry number (extension entry number), a LBA offset, and a continuous valid sector number. Each of the entries of the extension table TB3, for example, has the same number of entries of the LBA offsets and the same number of entries of the continuous valid sector numbers. Note that each of the entries of the extension table TB3 may have a different number of LBA entries and a different number of entries of the continuous valid sector numbers. The entry of the entry number En of the extension table TB3 shown in FIG. 10 corresponding to the extension index En of the data group DGn of the main table TB2 shown in FIG. 9 includes LBA offsets On0, On1, and so on and continuous valid sector numbers Bm0, Bn1, and so on. The LBA offset On0 corresponds to the continuous valid sector number Bn0. The LBA offset On1 corresponds to the continuous valid sector number Bn1. In the entry of the entry number En, the LBA offset On0 is smaller than the LBA offset On1. In other words, in the entry of the entry number En, the LBA offsets On0, On1, and so on are arranged in ascending order. The entry of the entry number En+1 of the extension table TB3 shown in FIG. 10 corresponding to the extension index En+1 of the data group DGn+1 of the main table TB2 shown in FIG. 9 includes LBA offsets O(n+1)0, O(n+1)1, and so on and continuous valid sector numbers B(n+1)0, B(n+1)1, and so on. The LBA offset O(n+1)0 corresponds to the continuous valid sector number B (n+1)0. The LBA offset O(n+1)1 corresponds to the continuous valid sector number B(n+1)1. In the entry of the entry number En+1, the LBA offset O(n+1)0 is smaller than the LBA offset O(n+1)1. In other words, in the entry of the entry number En, the LBA offsets O(n+1)0, O(n+1)1, and so on are arranged in ascending order.

In the example shown in FIG. 10, when it is determined that only some of the sectors are valid sectors among the sectors corresponding to the in-data-group sector number NSn continuously disposed from the in-data-group head sector to which the in-data-group head LBA Ln is allocated in the data group DGn, the system controller 150 records, in the entry of the entry number En corresponding to the data group OGn, the LBA offsets On0, On1, and so on and the continuous valid sector numbers Bn0, Bn1, and so on. The system controller 150 writes, in the extension index En of the entry of the main table TB2 corresponding to the data group DGn, the information of the link to the entry of the entry number En of the extension table TB3.

In the example shown in FIG. 10, when it is determined that only some of the sectors are valid sectors among the sectors corresponding to the in-data-group sector number NSn+1 continuously disposed from the in-data-group head sector to which the in-data-group head LBA Ln+1 is allocated in the data group DGn+1, the system controller 150 records, in the entry of the entry number En+1 corresponding to the data group LGn+1 of the extension table TB3, the LBA offsets O(n+1)0, O(n+1)1, and so on and the continuous valid sector numbers B(n+1)0, B(n+1)1, and so on. The system controller 150 writes, in the extension index En+1 of the entry of the main table TB2 corresponding to the data group DGn+1, the information of the link to the entry of the entry number En+1 of the extension table TB3.

FIG. 11 is a schematic diagram showing an example of the main table TB2. In the example shown in FIG. 11, the entry corresponding to data group DGm of the main table TB2 includes: the data group (entry number) DGm, an in-data-group head LBA 1000, an in-data-group sector number 100, an in-data-group head MCLBA 10000, and an extension index FFFFh. The entry corresponding to the data group DGm+1 of the main table TB2 includes: the data group (entry number) DGm+1, an in-data-group head LBA 5000, an in-data-group sector number 200, an in-data-qroup head MCLBA 20000, and an extension index 1. In FIG. 11, the main table TB2 is illustrated to include only the two entries corresponding to the two data groups of the data group DGm and the data group DGm+1, but may include only one entry corresponding to one data group or may include three entries corresponding to three or more data groups.

In the example shown in FIG. 11, the system controller 150 records the in-data-group head LBA 1000, the in-data-group sector number 100, and the in-data-group head MCLBA 10000 in the entry of the data group DGm of the main table TB2. When it is determined that all of the sectors are valid sectors among the sectors corresponding to the in-data-group sector number 100 continuously disposed from the in-data-group head sector to which the in-data-group head LBA 1000 is allocated in the data group DGm, the system controller 150 records FFFFh in the extension index of the entry of the main table TB2 corresponding to the data group DGm.

In the example shown in FIG. 11, the system controller 150 writes the in-data-group head LBA 5000, the in-data-group sector number 200, and the in-data-group head MCLBA 20000 in the entry of the data group DGm+1 of the main table TB2. When it is determined that only some of the sectors are valid sectors among the sectors corresponding to the in-data-group sector number 200 continuously disposed from the in-data-group head sector to which the in-data-group head LBA 5000 is allocated in the data group DGm+1, the system controller 150 writes, in the extension index 1 of the entry of the main table TB2 corresponding to the data group DGm+1, the information of the link to the particular entry of the extension table recording the disposition information of the valid sectors corresponding to the data group DGm+1.

FIG. 12 is a schematic diagram showing an example of the extension table TB3. FIG. 12 corresponds to, for example, FIG. 11. The entry of the entry number 1 of the extension table TB3 shown in FIG. 12 corresponding to the extension index 1 of the data group DGm+1 of the main table TB2 shown in FIG. 11 includes LBA offsets 0, 100, FFFFFFFFh, . . . , and FFFFFFFFh and continuous valid sector numbers 50, 100, FFFFFFFFh, . . . , and FFFFFFFFh. The entry "FFFFFFFFh", for example, means that it is not used or there is no data.

In the example shown in FIG. 12, when it is determined that only some of the sectors are valid sectors among the sectors corresponding to the in-data-group sector number 200 continuously disposed from the in-data-group head sector to which the in-data-group head LBA 5000 is allocated in the data croup DGm+1, the system controller 150 records, in the entry of the entry number 1 corresponding to the data group DGm+1, LBA offsets 0, 100, FFFFFFFFh, . . . , and FFFFFFFFh and continuous valid sector numbers 50, 100, FFFFFFFFh, . . . , and FFFFFFFFh. In the example shown in FIG. 12, in the data group DGm+1, the sectors corresponding to 50 sectors from the in-data-group head sector of the in-data-group head LBA 5000 are valid sectors, and the sectors corresponding to 100 sectors which are behind and distant from the in-data-group head sector of the in-data-group head LBA 5000 by 100 sectors are valid sectors. In other words, the sectors corresponding to 50 sectors from the sector which is behind and distant from the in-data-group head sector of the in-data-group head LBA 5000 by 50 sectors to the sector which is behind and distant from the in-data-group head sector of the in-data-group head LBA 5000 by 100 sectors correspond to invalid sectors, and the system controller 150 reserve these invalid sectors as a region on the media cache 10*b*. The system controller 150 writes, in the extension index 1 of the entry of the main table TB2 corresponding to the data group DGm+1, the information of the link to the entry of the entry number 1 of the extension table TB3.

Figure 13:
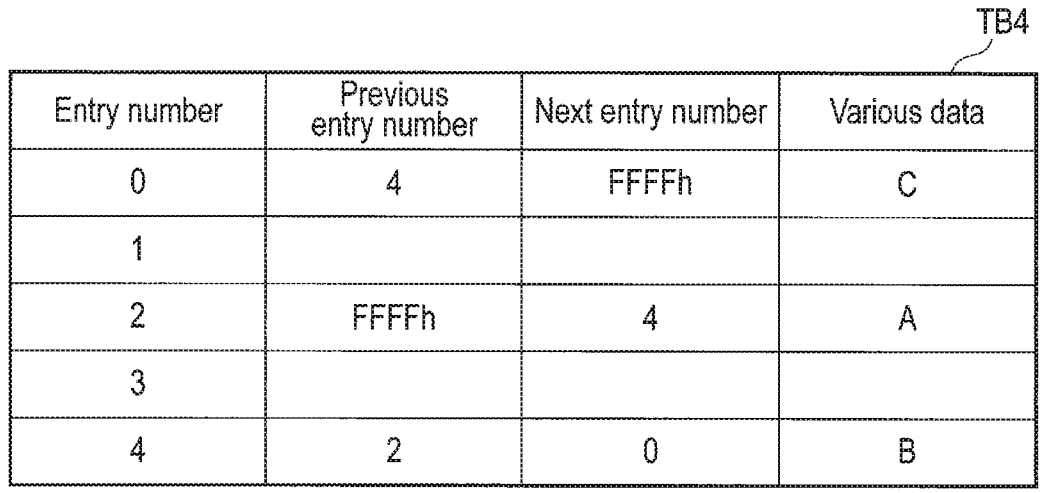
FIG. 13 is a schematic diagram for showing an example of a recording method of a media-cache control table.
Figure 14:
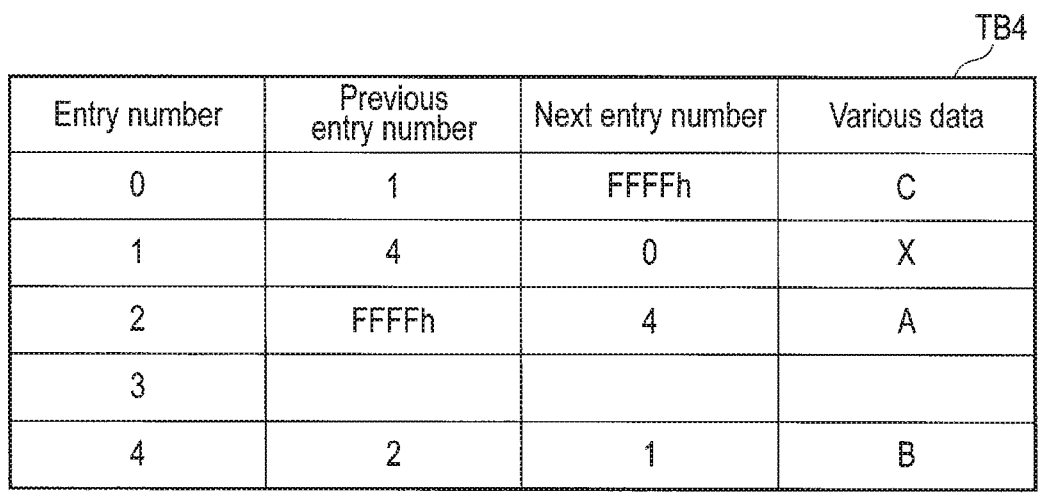
FIG. 14 is a schematic diagram for showing an example of a recording method of a media-cache control table.

FIG. 13 and FIG. 14 are schematic diagrams for showing an example of a recording method of media-cache control tables TB4. In FIG. 13 and FIG. 14, the media-cache control tables TB4 includes a main table and an extension table. Each entry of the media-cache control table TB4 of FIG. 13 includes a previous entry number, a next entry number, and various data. The previous entry number corresponds to the entry number of the various data which is immediately before the various data which is corresponding to the target entry. The next entry number corresponds to the entry number of the various data immediately after the various data which is corresponding to the target entry in the media cache 10*b*. The various data includes, for example, the in-data-group head LBA, the in-data-group sector number, the in-data-group head MCLBA, the extension index, the LBA offset, and the continuous valid sector number.

The entry of the entry number 0 of FIG. 13 includes the entry number 0, the previous entry number 4, the next entry number FFFFh, and various data C. The next entry number FFFFh means that no data is recorded in the region immediately after the various data corresponding to the target entry in the media cache 10*b*. The entry of the entry number 0 of FIG. 14 includes the entry number 0, the previous entry number 1, the next entry number FFFFh, and various data C. The entry of the entry number 1 of FIG. 14 includes the entry number 1, the previous entry number 4, the next entry number 0, and various data X.

The entries of the entry number 2 of FIG. 13 and FIG. 14 include the entry number 2, the previous entry number FFFFh, the next entry number 4, and various data A. The previous entry number FFFFh means that no data is recorded in the region immediately before the various data corresponding to the target entry in the media cache 10*b*.

The entry of the entry number 4 of FIG. 13 includes the entry number 4, the previous entry number 2, the next entry number 0, and various data B. The entry of the entry number 4 of FIG. 14 includes the entry number 4, the previous entry number 2, the next entry number 1, and the various data B.

In FIG. 13, the various data A, B, and C is arranged in this order in accordance with a certain rule. Also, in FIG. 14, the various data A, B, X, and C is arranged in this order in accordance with a certain rule.

When the disposition of entries is changed every time an entry is added or deleted in a table in which a plurality of entries are arranged by a certain rule such as ascending order, processing time is required. Therefore, the system controller 150 processes particular tables such as the main table and the extension table as chain structures as shown in FIG. 13 and FIG. 14.

In the example shown in FIG. 13, the system controller 150 arranges the various data A, B, and C in the described order in accordance with the certain rule in the media-cache control table TB4. In order to dispose the various data A first among the various data A, B, and C in accordance with the certain rule in the media-cache control table TB4, the system controller 150 records FFFFh as the previous entry number of the entry corresponding to the various data A and records the entry number 4 which is subsequent to the entry corresponding to the various data A. In order to dispose the various data B between the various data A and C among the various data A, B, and C in accordance with the certain rule in the media-cache control table TB4, the system controller 150 records the entry number 2, which corresponds to the various data A, as the previous entry number of the entry corresponding to the various data B and records the entry number 0, which corresponds to the various data C, as the next entry number of the entry corresponding to the various data B. In order to dispose the various data C after the various data B among the various data A, B, and C in accordance with the certain rule in the media-cache control table TB4, the system controller 150 records the entry number 4, which corresponds to the various data B, as the previous entry number of the entry corresponding to the various data C and records FFFFh as the next entry number of the entry corresponding to the various data C.

In the example shown in FIG. 14, the system controller 150 inserts various data X between the various data B and C among the various data A, B, and C arranged in accordance with the certain rule in the media-cache control table TB4 as shown in FIG. 13. In order to insert the various data X between the various data A and C among the various data A, B, and C in accordance with the certain rule in the media-cache control table TB4, the system controller 150 records the entry number 4, which corresponds to the various data B, as the previous entry number of the entry corresponding to the various data X and records the entry number 0, which corresponds to the various data C, as the next entry number of the entry corresponding to the various data X. The system controller 150 records the entry number 1, which corresponds to the various data X, as the next entry number of the entry corresponding to the various data B and records the entry number 1, which corresponds to the various data X, as the previous entry number of the entry corresponding to the various data C in the media-cache control table TB4.

The system controller 150 processing of rewriting (hereinafter, may be referred to as flash processing) particular data hereinafter, may be referred to as rewrite target data) of a band region (logical band or physical band) BA of the user data region 10*a* with particular data (hereinafter, may be referred to as rewrite data) written in the media cache 10*b*. The system controller 150 executes the flash processing when it is determined that execution of the flash processing is necessary, for example, because the usage rate of the media cache 10*b* has reached a particular value. For example, when the flash processing is to be executed, the system controller 150 records, by shingled recording, the data (hereinafter, may be referred to as front band data), which has been shingled-recorded before the region (hereinafter, may be referred to as a rewrite target region) to which the rewrite target data of the physical band (hereinafter, may be referred to as a rewrite-target physical band) BA corresponding to the logical band including the rewrite target data (hereinafter, may be referred to as a rewrite-target logical band), in a physical band corresponding to the spare band SBA. When the front band data of the rewrite-target physical band is written to the physical band corresponding to the spare band SBA, the system controller 150 records, by shingled recording, the rewrite data, which has been read from the media cache 10*b*, to the region (hereinafter, may be referred to as a spare target region) of the physical band corresponding to the spare band SBA and corresponding to the rewrite target region of the target physical band subsequent to the front band data. After the rewrite data is written to the spare target region, the system controller 150 records, by shingled recording, the data (hereinafter, may be referred to as rear band data), which has been shingled-recorded after the rewrite target region of the rewrite-target physical band BA, to the region subsequent to the spare target region of the physical band corresponding to the spare band SBA. When the rear band data of the rewrite-target physical band is recorded by shingled recording to the physical band corresponding to the spare band SBA, the system controller 150 changes the physical band corresponding to the spare band SBA to a rewrite-target logical band and changes the rewrite-target physical band to a spare band. In other words, when the rear band data of the rewrite-target physical band is recorded by shingled recording in the physical band corresponding to the spare band SBA, the system controller 150 switches the physical band, which corresponds to the spare band, with the rewrite-target physical band, which corresponds to the rewrite-target logical band.

Figure 15:
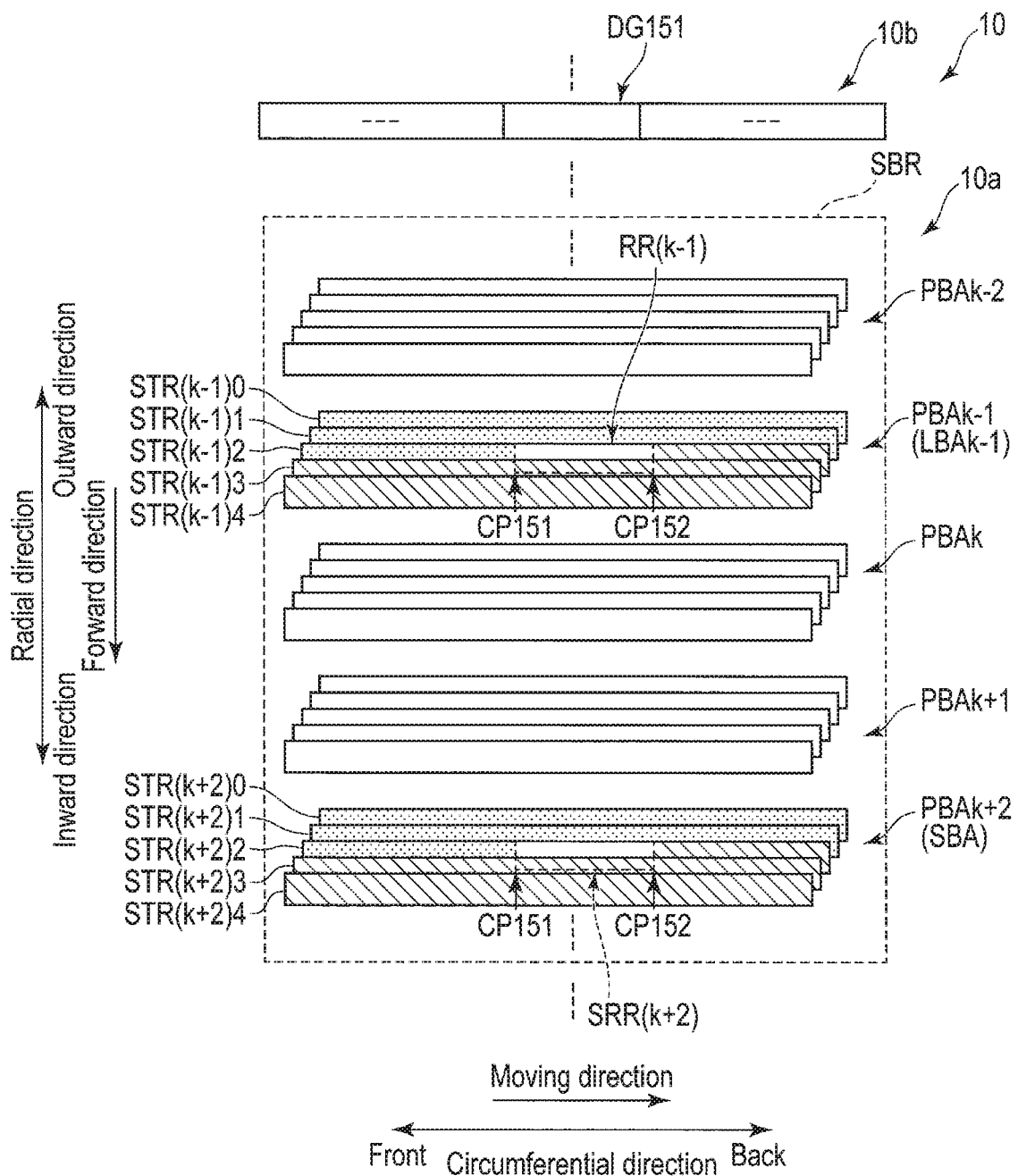
FIG. 15 is a schematic diagram showing an example of flash processing.

FIG. 15 is a schematic diagram showing an example of the flash processing. FIG. 15 corresponds to, for example, FIG. 5 to FIG. 7. In FIG. 15, the logical band numbers LBAk−2 to LBAk+2 are allocated to the physical bands PBAk−2 to PBAk+2, respectively, as shown in FIG. 6. In FIG. 15, the media cache 10b includes a data group (rewrite data) DG 151. In FIG. 15, the physical band PBAk−1 corresponds to the rewrite-target logical band LBAk−1, to which the logical band number LBAk−1 is allocated, and corresponds to the rewrite-target physical band as shown in FIG. 6. In the physical band PBAk−1, tracks STR(k−1)0, STR(k−1)1, STR(k−1)2, STR(k−1)3, and STR(k−1)4 are written in overlapped manner in the described order in the forward direction. The track STR(k−1)2 of the physical band PSAk−1 has the rewrite target region RR(k−1) to which the rewrite target data has been written. The rewrite target region RR(k−1) corresponds to the range from a circumferential position CP151 to a circumferential position CP152 in the circumferential direction of the track STR(k−1)2. In the band region PBAk−1, the data, which has been written to the track STR(k−1)2 positioned in front of the rewrite target region RR(k−1) and in front of the circumferential position CP151, the track STR(k−2)1, and the track STR(k−2)0, corresponds to the front band data. In the band region PBAk−1, the data, which has been written to the track STR(k−1)2 positioned after the rewrite target region RR(k−1) and after the circumferential position CP152, the track STR(k−1)3, and the track STR(k−1)4, corresponds to the rear band data. In FIG. 15, the band region PBAk+2 corresponds to the spare band SBA. In the band region PBAk+2, tracks STR(k+2)0, STR(k+2)1, STR(k+2)2, STR(k+2)3, and STR k+2)4 are written in overlapped manner in the described order in the forward direction. The track STR(k+2)2 of the band region PBAk+2 has the spare target region SRR(k+2). The spare target region SRR(k+2) corresponds to the range from the circumferential position CP151 to the circumferential position CP152 in the circumferential direction of the track STR(k+2)2. In FIG. 15, for the sake of convenience, each of the tracks of the band regions PBAk−2, PBAk−1, PBAk, PBAk+1, and PBAk+2 is shown in a rectangular shape extending in the circumferential direction with a particular track width, but is actually curved along the circumferential direction. Also, each of the tracks of the band regions PBAk−2, PBAk−1, PBAk, PBAk+1, and PBAk+2 may have a wavelike shape extending in the circumferential direction as the shape is varied in the radial direction. Note that the five band regions PBAk−2 to PBAk+2 are disposed in the subregion SBR in FIG. 15, but four or less band regions BA may be disposed therein, or six or more band regions BA may be disposed therein. Also, five tracks are written in overlapped manner in each of the physical bands PBAk−2 to PBAk+2, but four or less tracks may be written therein in overlapped manner, or six or more tracks may be written therein in overlapped manner.

In the example shown in FIG. 15, the system controller 150 executes the flash processing of writing the rewrite data DG151 to the rewrite target region RR(k−1) of the rewrite-target logical band LBAk−1. The system controller 150, for example, records, by shingled recording, the front band data of the logical band LBAk−1 (physical band PBAk−1) to the tracks STR(k+20 STR(k+1)1 and the track STR(k+2)2, which is in front of the circumferential position CP151, of the spare band SBA (physical band PBAk+2). When the front band data of the logical band LBAk−1 (physical band PBAk−1) is shingled-recorded in the spare band SBA (physical band PBAk+2), the system controller 150 records, by shingled recording, the rewrite data DG151, which has been read from the media cache 10b, to the spare target region SRR(k+2) of the spare band SBA (physical band PBAk+2). After the rewrite data DG151 written to the spare target region SRR(k+2) of the spare band SBA (physical band PBAk+2), the system controller 150, for example, records, by shingled recording, the rear band data of the logical band LBAk-1 (physical band PBAk−1) to the track STR(k+2)2 which is after the circumferential position CP152 of the spare band SBA (physical band PBAk+2), the track STR(k+2)3, and the track STR(k+2)4. When the rear band data of the logical band LBAk−1 (physical band PBAk−1) is recorded to the spare band (physical band PBAk+2) SBA by shingled recording, the system controller 150 allocates the logical band number LBAk−1 to the spare band SBA (physical band PBAk+2) to change the physical band PBAk+2 to the logical band LBAk−1 and sets the physical band PBAk−1 as the spare band SBA. Also, the system controller 150 invalidates the header of the rewrite data DG151 and deletes the entry of the rewrite data DG151 from the main table.

The system controller 150 executes processing of directly writing data to the user data region 10a without the intermediation of the media cache 10b (ray be referred to as bypass write or bypass write processing). When commands for sequentially writing a plurality of pieces of data transferred from the host 200 or the like (hereinafter, may be referred to as transfer data) are received from the host 200 or the like, the system controller 150 directly writes (bypass write) the plurality of pieces of transfer data to a particular band region BA without the intermediation of the media cache 10b. The transfer data includes, for example, block data or data groups. For example, only when data can be sequentially written from the head sector of a particular band region BA (hereinafter, may be referred to as an in-band head sector) to the tail end sector of this band region BA (hereinafter, may be referred to as an in-band tail-end sector), the system controller 150 executes bypass write. In other words, only when it is determined that the transfer data corresponding to one band region BA is to be sequentially written, the system controller 150 executes bypass write to the user data region 10a. For example, only when it is determined that the transfer data corresponding to one band region BA is to be sequentially written, the system controller 150 writes the transfer data corresponding to the one band region BA to the spare band SBA by bypass write. Note that, when bypass write to the spare band SBA cannot be carried out, for example, because it is being used, the system controller 150 may once write the data to the media cache 10b.

When a command for writing a plurality of pieces of transfer data to part of a band region BA is received from the host 200 or the like, the system controller 150 executes write processing (flash processing) of the plurality of pieces of transfer data to the particular band region BA with the intermediation of the media cache 1b. In other words, when it is determined that the transfer data corresponding to less than one band region BA is to be sequentially written, the system controller 150 executes write processing (flash processing) of the transfer data, which corresponds to less than one band region BA, with respect to the particular band region BA with the intermediation of the media cache 10b. In other words, when it is determined that the region to which the transfer data is to be sequentially written is smaller than the band region including the region to which the transfer data is to be sequentially written, the system controller 150 executes flash processing.

FIG. 16 is a schematic diagram showing an example of bypass write processing and flash processing. FIG. 16 shows LBA space of user data, the media cache 10b, the buffer 130, and the user data region 10a. The LBA space includes at least one stream of a plurality of pieces of transfer data. In the example shown in FIG. 16, in the LBA space, transfer data WD1, WD2, WD3, WD4, and WD5 is transferred in the described order. The transfer data WD3 has divided data (transfer data) WD3a and divided data (transfer data) WD3b. The transfer data WD5 has divided data (transfer data) WD5a and divided data (transfer data) WD5b. In FIG. 16, the buffer 130 has data (hereinafter, may be referred to as existing data) ED which has already been recorded in a particular recording region. FIG. 16 shows band regions (logical bands) BAm, BAm+1, and BAm+2. The existing data ED is written in the band region (logical band) BAm. In the example shown in FIG. 16, the transfer data WD1, WD2, and WD3a is allocated to the region subsequent to the existing data ED of the band region (logical band; BAm. The transfer data WD1, WD2, and WD3a is written from an intermediate position of the band region BAm. The transfer data WD3b, WD4, and WD5a is allocated to the band region (logical band) BAm+1. The data of the transfer data WD3b, WD4, and WD5a is sequentially written from the in-band head sector to the in-band tail-end sector of the band region BA-ml. The data of the transfer data WD5b and thereafter is allocated to the band region (logical band) BAm+2. The data of the transfer data WD5b and thereafter is sequentially written to the in-band head sector to the in-band tail-end sector of the band region BAm+2.

In the example shown in FIG. 16, the system controller 150 subjects the transfer data WD1, WD2, and WD3a to flash processing to the band region BAm of the user data region 1a. The system controller 150 once writes the transfer data WD1, WD2, and WD3a to the media cache 10b and move the data to the buffer 130. The system controller 150 reads the existing data ED, which is written in the band region BAm, and moves the data to the buffer memory 130. The system controller 150 continuously disposes the transfer data WD1, WD2, and WD3a after the existing data ED in the buffer memory 130 and sequentially records, by shingled recording, the existing data ED, the transfer data WD1, WD2, and WD3a in the described order in the band region BAm of the user data region 10a.

For example, in multi-stream write, write commands of other streams between the write commands of the transfer data WD1, WD2, and WD3a are executed, and the write commands in the same stream are therefore separately processed. Since the record processing of the transfer data with respect to the media cache 10b is recorded in accordance with the order in which the write commands are processed, the data or the like of a different stream may be disposed between the transfer data WD1, WD2, and WD3a. When each of the transfer data WD1, WD2, and WD3a, which is disposed with an interval therebetween in the media cache 10b, is to be read and recorded in the buffer 130, time is required for processing due to, for example, seeking and rotation waiting.

In the example shown in FIG. 16, the system controller 150 writes the transfer data WD3b, WD4, and WD5a to the band region BAm+1 of the user data region 10a by bypass write. For example, the system controller 150 writes the transfer data WD3b, WD4, and WD5a to the spare band SBA of the user data region 10a and, when the write of the transfer data WD3b, WD4, and WD5a to the spare band SBA is completed, switches the spare band SBA with the band region BAm+1. Note that, when the spare band SBA of the user data region 10a is being used, the system controller 150 may once write the transfer data WD3b, WD4, and WD5a to the media cache 10b and write the data to the band region BAm+1 by flash processing. In such a case, the physical band corresponding to the band region BAm+1 may be used for another use, for example, may be used as a spare band for the bypass write processing of the other transfer data.

Also, the system controller 150 writes the data of the transfer data WD5b and thereafter to the user data region BAm+2 by bypass write. For example, the system controller 150 writes the data of the transfer data WD5b and thereafter to the spare band SBA of the user data region 10a and, when the write of the data of the transfer data WD5b and thereafter to the spare band SBA is completed, switches the spare band SBA with the band region BAm+2. Note that, when the spare band SBA of the user data region 10a is being used, the system controller 150 may once write the data of the transfer data WD5b and thereafter to the media cache 10b and write the data to the band region BAm+2 by flash processing. In such a case, the physical band corresponding to the band region BAm+2 may be used for another use, for example, may be used as a spare band for bypass write processing of other transfer data.

When it is determined that it is sequential write by receiving, for example, a command (commands) for writing data having a particular data capacity, a particular length (hereinafter, may be referred to as data length), or a particular sector number, the system controller 150 reserves, in the media cache 10b, a region (hereinafter, may be referred to as a retention region) in which the data to be written by sequential write can be continuously written. For example, when it is determined that particular data is to be written to the disk 10 by sequential write, the system controller 150 reserves a retention region by newly generating (or creating) a retention region when no retention region is present in the media cache 10b. When a retention region is to be reserved in the media cache 10b, the system controller 150 records the sector number of the retention region as the in-data-group sector number of the entry corresponding to the retention region in the main table TB2. Also, when the retention region is to be reserved in the media cache 1b, the system controller 150 records (or adds) the disposition information of valid sectors, which are in the retention region, as an entry corresponding to the retention region in the extension table TB3. For example, when it is determined that all the data has been written to the retention region SWA, the system controller 150 subjects the data, which has been written to the retention region SWA in a particular region of the disk 10, to write processing (flash processing).

For example, when flash processing is to be executed for the band region logical band) BA in which existing data is written, the system controller 150 reserves the retention region, which corresponds to the remaining band region BA (hereinafter, may be referred to as a remaining band region) excluding the region in which the existing data is written, in the media cache 11C. For example, when the retention region corresponding to the remaining band region is to be reserved in the media cache 10b, the system controller 150 records the sector number of the remaining band region as the in-data-group sector number of the entry corresponding to the retention region of the main table TB2. For example, when the retention region corresponding to the remaining band region is to be reserved in the media cache 10b, the system controller 150 records (or adds) the disposition information of valid sectors of the retention region as the entry corresponding to the retention region in the extension table TB3. For example, when it is determined that all the data to be recorded in the remaining band region has been written to the retention region, the system controller 150 subjects the data, which is written in the retention region, to write processing (flash processing) to the particular remaining band region in the disk 10. Also, for example, when flash processing is to be executed for the band region (logical band or physical band) BA in which the existing data is written and when bypass write cannot be carried out for the spare band SBA, the system controller 150 reserves a retention region corresponding to the remaining band region and a retention region corresponding to one band region BA in the media cache 10b in continuous disposition. For example, when it is determined that all the data of the remaining band region and the one band region BA has been written to these retention regions, the system controller 150 subjects the data, which has been written to these retention regions, to write processing (flash processing) to a particular remaining band region of the disk 10 and a particular band region of the disk 10.

Figure 17:
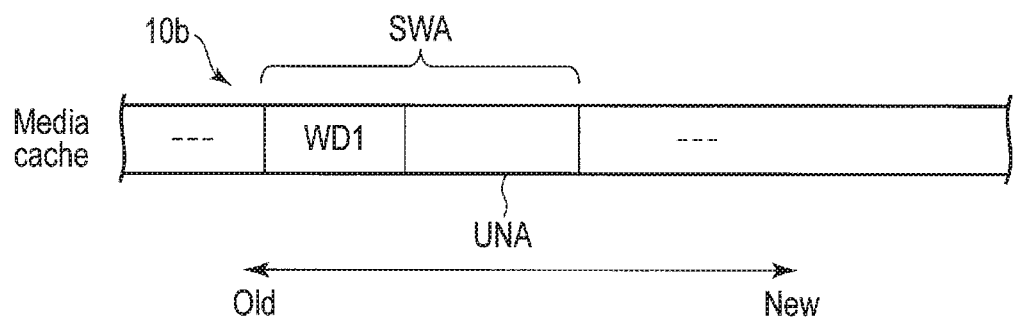
FIG. 17 is a schematic diagram showing an example of write processing with respect to the media cache according to the first embodiment.
Figure 18:
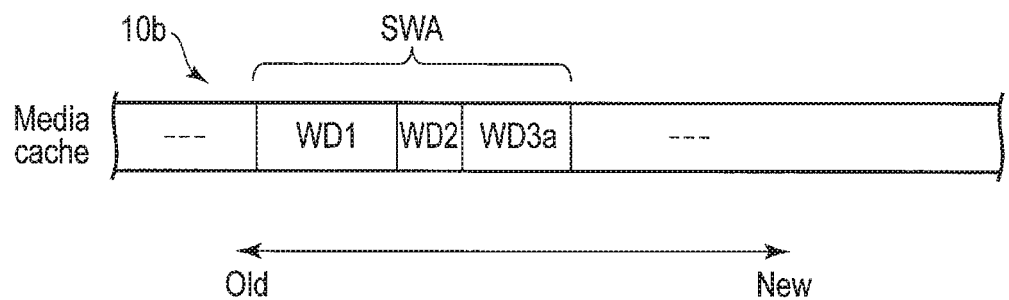
FIG. 18 is a schematic diagram showing an example of write processing with respect to the media cache according to the first embodiment.

FIG. 17 and FIG. 1K are schematic diagrams showing an example of write processing with respect to the media cache 10b according to the present embodiment. FIG. 17 and FIG. 18 correspond to, for example, FIG. 16. FIG. 17 and FIG. 18 shows the retention region SWA. FIG. 17 shows a region (hereinafter, may be referred to as an unused region) UNA in which data is not written in the retention region SWA.

In the example shown in FIG. 17, when it is determined that the transfer data WD1, WD2, and WD3a is to be written to the band region BAm by sequential write by flash processing, the system controller 150 reserves the retention region SWA, which has the sector number corresponding to the transfer data WD1, WD2, and WD3a, in the media cache 10b. When the transfer data WD1 is received from the host 200 or the like, the system controller 150 writes the transfer data WD1 to the retention region SWA. The system controller 150 records the sector number corresponding to the transfer data WD1, WD2, and WD3a as the in-data-group sector number of the entry corresponding to the retention region SWA of the main table TB2, records 0 as the LBA offset of the entry corresponding to the retention region SWA of the extension table TB3, and records the sector number of the transfer data WD1 as the continuous valid sector number of the entry corresponding to the retention region SWA of the extension table TB3.

In the example shown in FIG. 18, when, for example, the transfer data WD2 and WD3a which is in the same stream as the transfer data WD1 is received from the host 200 or the like, the system controller 150 sequentially writes the data to the unused region UNA of the retention region SWA. When the transfer data WD2 is received from the host 200 or the like, the system controller 150 writes the transfer data WD2 after the transfer data WD1 in the retention region SWA. When the transfer data WD3a is received from the host 200 or the like, the system controller 150 writes the transfer data WD3a after the transfer data WD2 in the retention region SWA. The system controller 150 adds a plurality of LBA offsets, which respectively correspond to the transfer data WD2 and WD3a, to the entry corresponding to the retention region SWA in the extension table TB3 and adds continuous valid sector numbers, which respectively correspond to the transfer data WD2 and WD3a, to the entry corresponding to the retention region SWA in the extension table TB3. For example, when it is determined that all the transfer data WD1, WD2, and WD3a has been written to the retention region SWA, the system controller 150 writes the transfer data WD1, WD2, and WD3a, which is written in the retention region, to the remaining band region of the band region BAm by write processing (flash processing). Note that, when transfer data of a stream which is different from the transfer data WD1 is received from the host 200 or the like, the system controller 150 writes the data to the media cache 10b other than the retention region SWA. Also, the order of the transfer data WD2 and WD3a may be switched. In such a case, the transfer data WD3a and WD2 is written in the retention region SWA in the described order. The positions to which the transfer data WD2 and WD3a is written in the disk 10 are the same as the case in which the transfer data is received in the described order of the transfer data WD2 and WD3a.

FIG. 19 is a flow chart showing an example of the write processing according to the present embodiment.

The system controller 150 determines whether the data transferred from the host 200 or the like by a command of the host 200 or the like is to be subjected to sequential write or not subjected to sequential write (B1901). When it is determined that sequential write is not to be carried out (NO of B1901), the system controller 150 records the data in the media cache 10b (B1902) and proceeds to the processing of B1908. When it is determined that sequential write is to be carried out (YES of B1901), the system controller 150 determines whether bypass write is to be carried out or bypass write is not to be carried out (B1903). When it is determined that bypass write is to be carried out (YES of B1903), the system controller 150 determines whether the spare band SBA can be used or cannot be used (B1904). When it is determined that the spare band SBA can be used (YES of B1904), the system controller 150 records the data in the spare band SBA (31905) and terminates the processing. When it is determined that the spare band SBA cannot be used (NO of B1904), the system controller 5C proceeds to the processing of B1906.

When it is determined that bypass write is not to be carried out (NO of B1903), the system controller 150 newly creates and reserves the retention region SWA in the media cache 10b when the retention region is not present (B1906). The system controller 150 records the data, which is to be sequentially written to the particular band region BA, in the retention region SWA (B1907). When it is determined that flash processing is necessary, for example, because all of the retention region SWA has been written or the usage rate of the media cache 10b has reached a particular value, the system controller 150 executes flash processing of the media cache 10b (B1908) and terminates the processing.

According to the first embodiment, when it is determined that sequential write is to be carried out, the magnetic disk device 1 reserves the retention region SWA of the user data region 10a in the media cache 10b and records the data, which is to be sequentially written to the user data region 10a, in the retention region SWA. The magnetic disk device 1 writes the data, which has been recorded in the retention region SWA, to the spare band SBA. When the write processing of the data, which has been recorded in the retention region SWA, to the spare band SBA has been completed, the magnetic disk device 1 allocates the logical band number of the target logical band to the physical band, which corresponds to the spare band SBA, to change the band to a new target logical band. Since the data to be sequentially written is collectively written to the retention region SWA of the media cache 10b, the magnetic disk device 1 can efficiently access the data when the data is moved from the media cache 10b to the user data region 10a. Therefore, the magnetic disk device 1 can improve the efficiency of the access to the media cache 10b. The magnetic disk device 1 can also improve the throughput of write commands. Therefore, the magnetic disk device 1 can improve write processing performance.

Next, magnetic disk devices according to other modification examples will be described. In other modification examples, the parts same as those of the above described embodiment are denoted with the same reference signs, and detailed description thereof will be omitted.

Modification Example 1

A magnetic disk device 1 according to Modification Example 1 has a write processing method which is different from that of the magnetic disk device 1 of the above described first embodiment.

A system controller 150 writes a header only when the data transferred first from the host 200 or the like such as the data to be written to an in-data-group head sector is to be written to a retention region SWA. In other words, when the data other than the data which has been transferred first from the host 200 or the like is to be written to the retention region SWA, the system controller 150 does not write the header. When the data other than the data which has been transferred first from the host 200 or the like is to be written to the retention region SWA, the system controller 150 adds (records), in the entry of an extension table TB3 corresponding to the retention region SWA, the disposition information of valid sectors corresponding to the data other than the data which has been transferred first from the host 200 or the like.

Since the extension table TB3 is not always written in a disk 10, for example, in a system area 10c, when power or the like is shut down, the system controller 150 restores the extension table TB3. For example, when power or the like is shut down, the system controller 150 restores the extension table TB3 by reading a media cache 10b. Since the media cache 10b is a FIFO of a ring buffer, an ID is added to the data written to the media cache 10b. This ID is changed when LBA allocated to each sector of the media cache 10b returns from tail-end media cache LBA to a head media cache LBA. For example, the ID may be included in servo data. Therefore, since valid sectors can be distinguished by reading the media cache 10b, the system controller 150 can restore the extension table TB3.

Figures 20, 21:
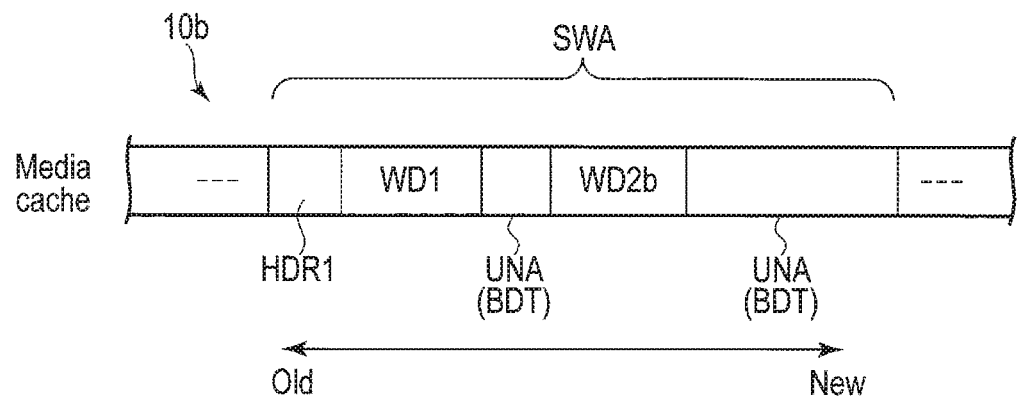
FIG. 20 is a schematic diagram showing an example of write processing to a media cache according to Modification Example 1.
FIG. 21 is a schematic diagram showing an example of an extension table according to Modification Example 1.

FIG. 20 is a schematic diagram showing an example of write processing to the media cache 10b according to Modification Example 1. FIG. 20 corresponds to, for example, FIG. 16. FIG. 20 shows partial transfer data WD2b of the transfer data WD2 shown in FIG. 16. In FIG. 20, in unused regions UNA, substrate data BDT having IDs which are different from that of the data currently written in the retention region is written. In FIG. 20, for example, the IDs of transfer data WD1 and the transfer data WD2b are the same. The IDs of the transfer data WD1 and WD2b are different from the ID of the substrate data BDT.

In the example shown in FIG. 20, when the transfer data WD1 is received from the host 200 or the like, the system controller 150 writes the transfer data WD1 to the retention region SWA and writes a header HDR1 to the retention region SWA in front of the transfer data WD1. When the transfer data WD2b which is the same stream as the transfer data WD1 is received from the host 200 or the like, the system controller 150 writes the transfer data WD2b to the retention region SWA after the transfer data WD1.

FIG. 21 is a schematic diagram showing an example of the extension table TB3 according to Modification Example 1. FIG. 21 corresponds to, for example, FIG. 20. The entry of an entry number E21 of the extension table TB3 shown in FIG. 21 corresponding to the retention region SWA of FIG. 20 includes LBA offsets OFS1, OFS2, FFFFFFFFh, . . . , and FFFFFFFFh and continuous valid sector numbers NS1, NS2, FFFFFFFFh, . . . , and FFFFFFFFh. The LBA offset OFS1 and the continuous valid sector number NS1 correspond to the disposition information of valid sectors corresponding to the retention region SWA to which the transfer data WD1 has been written. The LBA offset OFS2 and the continuous valid sector number NS2 correspond to the disposition information of valid sectors corresponding to the retention region SWA to which the transfer data WD2b has been written.

In the example shown in FIG. 21, the system controller 150 records the LBA offset OFS1 and the continuous valid sector number NS1, which correspond to the retention region SWA to which the transfer data WD1 has been written, in the entry E21 of the extension table TB3. Also, when the transfer data WD2b is written to the retention region SWA after the transfer data WD1 is written to the retention region SWA, the system controller 150 adds the LBA offset OFS2 and the continuous valid sector number NS2, which correspond to the retention region SWA to which the transfer data WD2b has been written, to the entry E21 of the extension table TB3.

When power or the like is shut down, according to the ID of the transfer data WD1 and WD2b written to the retention region SWA of the media cache 10b shown in FIG. 20, the system controller 150 determines that the sectors of the retention region SWA to which the transfer data WD1 and WD2b has been written are valid sectors. The system controller 150 reads the transfer data WD1 and WD2b, which has been written to the retention region SWA of the media cache 10b, and restores the extension table TB3 shown in FIG. 21.

The magnetic disk device 1 according to Modification Example 1 writes the header only when the data transferred first from the host 200 or the like is to be written to the retention region SWA. Therefore, the magnetic disk device 1 can improve write processing performance.

Note that, in the above described embodiment and modification example, the magnetic disk device 1 is a magnetic disk device of a shingled recording type. However, the configurations of the above described embodiment and modification example can be applied also to a magnetic disk device of a normal recording type. For example, when random write is concentrated in a particular region of the user data region 10a, the magnetic disk device 1 may reserve a region corresponding to the retention region SWA in the media cache 10b and write the data, which is written in the region in which the random write is concentrated, to the region corresponding to the retention region SWA as shown in FIG. 17 and FIG. 18. The magnetic disk device 1 reads the data from the region corresponding to the retention region SWA and writes the data to the region in which the random write is concentrated.

While certain embodiments have been described, these embodiments nave been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk having a first region to which data is written by normal recording that writes a plurality of tracks with an interval in a radial direction and having a second region to which data is written by shingled recording that writes a plurality of tracks overlapped in the radial direction;
a head configured to write the data to the disk and read the data from the disk; and
a controller configured to, when first data and second data is to be sequentially written to a third region of the second region, reserve a fourth region corresponding to the first data and the second data in the first region, write the first data to the fourth region, write the second data after the first data in the fourth region, and sequentially write the first data and the second data read from the fourth region to the third region.

2. The magnetic disk device according to claim 1, wherein,
when a fifth region of the third region to which the first data and the second data is to be written is smaller than the third region, the controller reserves the fourth region in the first region.

3. The magnetic disk device according to claim 1, wherein,
when third data is written in the third region, the controller reserves the fourth region in the first region.

4. The magnetic disk device according to claim 1, wherein,
when the first data is to be written to the fourth region, the controller adds a header to the first data.

5. The magnetic disk device according to claim 4, wherein the header includes LBA of the first data, a number of sectors in the fourth region, and an identification number of a first sector to which the first data is written in the first region.

6. The magnetic disk device according to claim 1, wherein the controller has a table including disposition information of a sector to which the data is written in the fourth region.

7. The magnetic disk device according to claim 6, wherein the table includes a first value corresponding to a number of sectors from a first head sector at a head of the fourth region to a second head sector at a head of a plurality of sectors to which the data is written and includes a second value corresponding to a number of sectors to which the data is continuously written from the second head sector.

8. The magnetic disk device according to claim 6, wherein the controller records, in the table, first disposition information of the sector to which the first data is written in the fourth region when the first data is written to the fourth region and records, in the table, second disposition information of the sector to which the second data is written when the second data is written to the fourth region.

9. The magnetic disk device according to claim 1, wherein the controller directly writes third data corresponding to a fifth region of the second region to the fifth region.

10. The magnetic disk device according to claim 1, wherein
the first region is a region that temporarily retains the data to be written to the second region.

11. A write processing method applied to a magnetic disk device including a disk having a first region to which data is written by normal recording that writes a plurality of tracks with an interval in a radial direction and having a second region to which data is written by shingled recording that writes a plurality of tracks overlapped in the radial direction and the device comprising a head configured to write the data to the disk and read the data from the disk, the write processing method comprising:
reserving, when first data and second data is to be sequentially written to a third region of the second region, a fourth region corresponding to the first data and the second data in the first region;
writing the first data to the fourth region and writing the second data after the first data in the fourth region; and
sequentially writing the first data and the second data read from the fourth region to the third region.

12. The write processing method according to claim 11, further comprising,
when a fifth region of the third region to which the first data and the second data is to be written is smaller than the third region, reserving the fourth region in the first region.

13. The write processing method according to claim 11, further comprising,
when third data is written in the third region, reserving the fourth region in the first region.

14. The write processing method according to claim 11, wherein,
when the first data is to be written to the fourth region, adding a header to the first data.

15. The write processing method according to claim 14, wherein
the header includes LBA of the first data, a number of sector in the fourth region, and an identification number of a first sector to which the first data is written in the first region.

16. The write processing method according to claim 11, wherein
a table including disposition information of a sector to which the data is written in the fourth region is included.

17. The write processing method according to claim 16, wherein
the table includes a first value corresponding to a number of sectors from a first head sector at a head of the fourth region to a second head sector at a head of a plurality of sectors to which the data is written and includes a second value corresponding to a number sectors to which the data is continuously written from the second head sector.

18. The write processing method according to claim 16, further comprising:
   recording, in the table, first disposition information of the sector to which the first data is written in the fourth region when the first data is written to the fourth region; and
   recording, in the table, second disposition information of the sector to which the second data is written when the second data is written to the fourth region.

19. The write processing method according to claim 11, further comprising,
   directly writing third data corresponding to a fifth region of the second region to the fifth region.

20. The write processing method according to claim 11, wherein
   the first region is a region that temporarily retains the data to be written to the second region.

\* \* \* \* \*